US007774596B2

(12) United States Patent
Flynn

(10) Patent No.: US 7,774,596 B2
(45) Date of Patent: Aug. 10, 2010

(54) SYSTEM AND METHOD FOR UPDATING FIRMWARE IN A SECURE MANNER

(75) Inventor: Rex A. Flynn, Newton, MA (US)

(73) Assignee: Insyde Software Corporation, Taipei (TW)

( * ) Notice: Subject to any disclaimer, the term of this patent is extended or adjusted under 35 U.S.C. 154(b) by 973 days.

(21) Appl. No.: 11/344,855

(22) Filed: Feb. 1, 2006

(65) Prior Publication Data
US 2006/0174240 A1 Aug. 3, 2006

Related U.S. Application Data

(60) Provisional application No. 60/649,486, filed on Feb. 2, 2005.

(51) Int. Cl.
H04L 29/06 (2006.01)
(52) U.S. Cl. .............................. 713/161; 713/1; 713/2; 713/100; 713/176; 713/181
(58) Field of Classification Search .................. 713/1, 713/2, 100, 161, 176, 181
See application file for complete search history.

(56) References Cited

U.S. PATENT DOCUMENTS

| 6,324,644 | B1 * | 11/2001 | Rakavy et al. ................. 713/1 |
| 6,510,521 | B1 * | 1/2003 | Albrecht et al. ............. 713/193 |
| 6,581,159 | B1 * | 6/2003 | Nevis et al. .................... 713/2 |
| 6,976,163 | B1 * | 12/2005 | Hind et al. .................. 713/156 |
| 7,017,040 | B2 * | 3/2006 | Singer et al. ................... 713/2 |
| 7,103,641 | B2 * | 9/2006 | Brannock .................... 709/217 |
| 7,213,052 | B2 * | 5/2007 | Mae et al. .................... 709/206 |
| 7,231,513 | B1 * | 6/2007 | Eydelberg ...................... 713/2 |
| 7,262,875 | B2 * | 8/2007 | Hino et al. .................. 358/1.15 |
| 7,337,309 | B2 * | 2/2008 | Nguyen et al. ................. 713/1 |
| 7,457,945 | B2 * | 11/2008 | Dailey et al. ................... 713/2 |
| 2002/0143884 | A1 * | 10/2002 | Hino et al. ................... 709/206 |
| 2002/0194313 | A1 * | 12/2002 | Brannock .................... 709/220 |
| 2004/0103347 | A1 * | 5/2004 | Sneed et al. ................... 714/32 |
| 2004/0243798 | A1 * | 12/2004 | Goud et al. .................. 713/100 |
| 2004/0268339 | A1 * | 12/2004 | Van Someren et al. ...... 717/172 |
| 2005/0021968 | A1 * | 1/2005 | Zimmer et al. .............. 713/176 |
| 2005/0125649 | A1 * | 6/2005 | Lu et al. ......................... 713/1 |
| 2005/0216753 | A1 * | 9/2005 | Dailey et al. ................ 713/191 |
| 2006/0005046 | A1 * | 1/2006 | Hars ............................. 713/191 |

(Continued)

OTHER PUBLICATIONS

U.S. Office Action for U.S. Appl. No. 11/344,799, dated Jul. 30, 2008.

(Continued)

Primary Examiner—Thomas Lee
Assistant Examiner—Jaweed A Abbaszadeh
(74) Attorney, Agent, or Firm—Lahive & Cockfield, LLP; John S. Curran

(57) ABSTRACT

A mechanism that allows firmware to be updated in a secure manner is discussed. Two attributes are used in the actual ROM to refer to a Virtual ROM module. The two attributes are a version attribute and a reference to a separate module that is capable of validating updates. The update process updates the message digest associated with the first Virtual ROM module and the version attribute associated with the first Virtual ROM module. The update process also produces a new copy of the corresponding file (that may be located on the local disk) that when hashed will "match" the new message digest.

23 Claims, 17 Drawing Sheets

U.S. PATENT DOCUMENTS

| | | | |
|---|---|---|---|
| 2006/0020837 A1* | 1/2006 | Rothman et al. | 713/310 |
| 2006/0107071 A1* | 5/2006 | Girish et al. | 713/191 |
| 2006/0136703 A1* | 6/2006 | Wisecup et al. | 713/2 |
| 2006/0143475 A1* | 6/2006 | Herbert et al. | 713/191 |
| 2006/0143600 A1* | 6/2006 | Cottrell et al. | 717/168 |

OTHER PUBLICATIONS

U.S. Office Action for U.S. Appl. No. 11/344,779, dated Feb. 2, 2009.
U.S. Office Action for U.S. Appl. No. 11/344,856, dated Mar. 4, 2009.

* cited by examiner

SYSTEM AND METHOD FOR UPDATING FIRMWARE IN A SECURE MANNER

RELATED APPLICATIONS

The present invention claims the benefit of and priority to a U.S. provisional application entitled "System and Method for Reducing Memory Requirements of Firmware and Providing Secure Updates and Storage Areas for Firmware" filed Feb. 2, 2005, U.S. Application No. 60/649,486, and is related to pending U.S. applications entitled "System and Method For Reducing Memory Requirements of Firmware" filed Feb. 1, 2006, Ser. No. 11/344,779, and "System and Method for Securely Storing Firmware", filed Feb. 1, 2006, Ser. No. 11/344,855.

FIELD OF THE INVENTION

The illustrative embodiment of the present invention relates generally to firmware that performs POST on a PC, including BIOS firmware, and more particularly to updating firmware in a secure manner.

BACKGROUND

In recent years, there has been an increased demand for larger amounts of firmware code to be made available to PC's pre-boot. Firmware is software that has been written onto Read-Only Memory (ROM) modules including but not limited to ROM, PROM, EPROM, EEPROM, and Flash memory. One reason for the increasing firmware demand is the increasing complexity of the operations required to be performed by the firmware (BIOS or Framework) (the term "Framework" is used herein to refer to Intel Corporation's (of Santa Clara, Calif.) "Platform Innovation Framework for EFI" and is discussed further below) in starting a PC and making it ready to load an operating system (OS). Another reason for the increased demand is that there is considerable interest in the industry in creating additional value-added features that run in the pre-boot environment before the operating system has loaded.

Unfortunately there are a number of issues associated with conventional methods of using firmware. The increased demand to make larger amounts of firmware code available pre-boot has not been fully met by increases in the storage available on a ROM or Flash part due to the fact that there are strong incentives in industry to keep the cost of the hardware for a PC down. Additionally, the demand for increasing firmware code also requires a secure means for communicating with other software environments, including servers on the Internet, and code that runs after an operating system has loaded. Furthermore, while there are existing solutions for securing content pre-boot, these existing solutions either rely on a dedicated partition that is made available on a local disk drive, or on a separate security chip that provides the ability to store and hide a key. There has also been significant attention devoted to the task of updating firmware stored on a Flash part in a safe manner. Current methods of updating firmware stored on a Flash part include a risk to the future operability of the computer, since a failure to complete the update successfully can cause the computer to become inoperable. Allowing such updates also imposes a small security risk in that the Flash firmware often has complete access to the internals of the computer.

BRIEF SUMMARY OF THE INVENTION

The illustrative embodiment of the present invention provides a mechanism for making increased amounts of firmware available to a computer pre-boot. To increase the amount of firmware available pre-boot, a design decision is made during the build process as to which segments of the firmware need to be placed on the ROM part and which segments of the firmware can be located elsewhere. The segments of the firmware that are stored remotely from the ROM are referred to as "virtual ROM modules". Each of the virtual ROM modules is assigned a generated unique identifier, and a "message digest" is constructed for each module using an algorithm such as MD5 or SHA-1. The message digest represents the virtual module uniquely so that if the virtual module changes, the message digest changes. In the software build of the ROM image, the message digest—unique identifier pair created for each Virtual ROM module is used as a logical pointer for the virtual module. Additionally, a search path variable is placed into the ROM image in non-volatile storage. The search path provides for one or more locations in which to look for the Virtual ROM modules, and may be updated at a later point in time.

The actual ROM image (containing the logical pointers to the virtual modules) is placed on a ROM or Flash part on the PC during the manufacturing process. When the actual ROM image wishes to execute a Virtual ROM module, it retrieves the unique identifier associated with the Virtual ROM module, and uses the search path variable together with the unique identifier to locate a copy of the Virtual ROM module. It may load the module from a local disk, from a CD ROM or any other storage medium, as well as download it over a network. Once it has loaded the module, it runs the same message digest algorithm over the module and verifies that the module has not been changed before execution.

The illustrative embodiment of the present invention also allows firmware to be updated in a secure manner. Two additional attributes are used in the actual ROM to refer to the Virtual ROM module. The two additional attributes are a version attribute and a reference to a separate module that is capable of validating updates. This separate module may or may not be incorporated into the actual ROM—it may be the unique identifier for another Virtual ROM module. The update process updates the message digest associated with the first Virtual ROM module and the version attribute associated with the first Virtual ROM module. The update process also produces a new copy of the corresponding file (that may be located on the local disk) that when hashed ("hashing" in this case means running one of the message digest algorithms over the file) will "match" the new message digest, in a manner that corresponds to the process described above.

Following download of the update module, a validation module verifies that it is acceptable to perform the update. Content traveling across a network is validated through one of a variety of well-understood mechanisms for validating content that is transmitted across the Internet such as a public-private key pair to encrypt and decrypt a message digest that is made of the content using the SHA-1 algorithm. Multiple update validation modules may be used that each refer to firmware that is made available by a different firmware vendor which may each employ a different validation scheme. Even in situations where the different firmware vendors use the same firmware mechanism, each vendor may use their own public-private key pair for signing the content.

In one aspect of the present invention a method for securely updating firmware in an electronic device includes the step of dividing a firmware image to create multiple virtual image modules. The multiple virtual image modules are stored in at least one location outside a ROM image located in the electronic device. The method also includes the step of providing an update validation procedure for validating an updated virtual image module during pre-boot. The update validation procedure is identified by a unique identifier and includes a decryption process. The method additionally includes a reference for each of the multiple virtual image modules in a build of firmware placed in the ROM image. Each reference includes a version identifier, a message digest and a unique identifier for an associated virtual image module. The build of firmware in the ROM image also includes a reference to the update validation procedure. The method additionally provides an updated virtual image module that includes a version identifier and uses the update validation procedure identified by the reference in the ROM image to validate the updated virtual image module during pre-boot.

In another aspect of the present invention, a system for securely updating firmware in an electronic device includes multiple virtual firmware image modules created during a build process. The multiple virtual image modules are stored in at least one location outside a ROM image located in an electronic device. The system also includes an update validation procedure that includes a decryption process used in validating an updated virtual module. Also, the system includes a firmware ROM image that includes a reference to the update validation procedure and a reference for each of the multiple virtual image modules. Each reference includes a version identifier, a message digest and a unique identifier for an associated virtual image module. The unique identifier is used to retrieve the referenced virtual image module during pre-boot and the message digest is used to verify the authenticity of the virtual image module prior to executing the retrieved image module.

In one aspect of the present invention, a method for securely updating firmware in an electronic device includes the step of dividing a firmware image to create multiple virtual image modules that are stored in at least one location outside a ROM image located in the electronic device. The method also provides an update validation procedure for validating an updated virtual image module during pre-boot. The update validation procedure is identified by a unique identifier and includes a decryption process. The method additionally includes a reference for each of the multiple virtual image modules in a build of firmware placed in the ROM image. The build of firmware in the ROM image also includes a reference to the update validation procedure. The method also includes the steps of providing an updated virtual image module on a trusted server using the update validation procedure identified by the reference in the ROM image to generate a secure tunnel between the electronic device and the trusted server. The method additionally downloads an identified updated virtual image module to the electronic device using the tunnel. The downloaded virtual image replaces one of the multiple image modules referenced in the ROM image.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
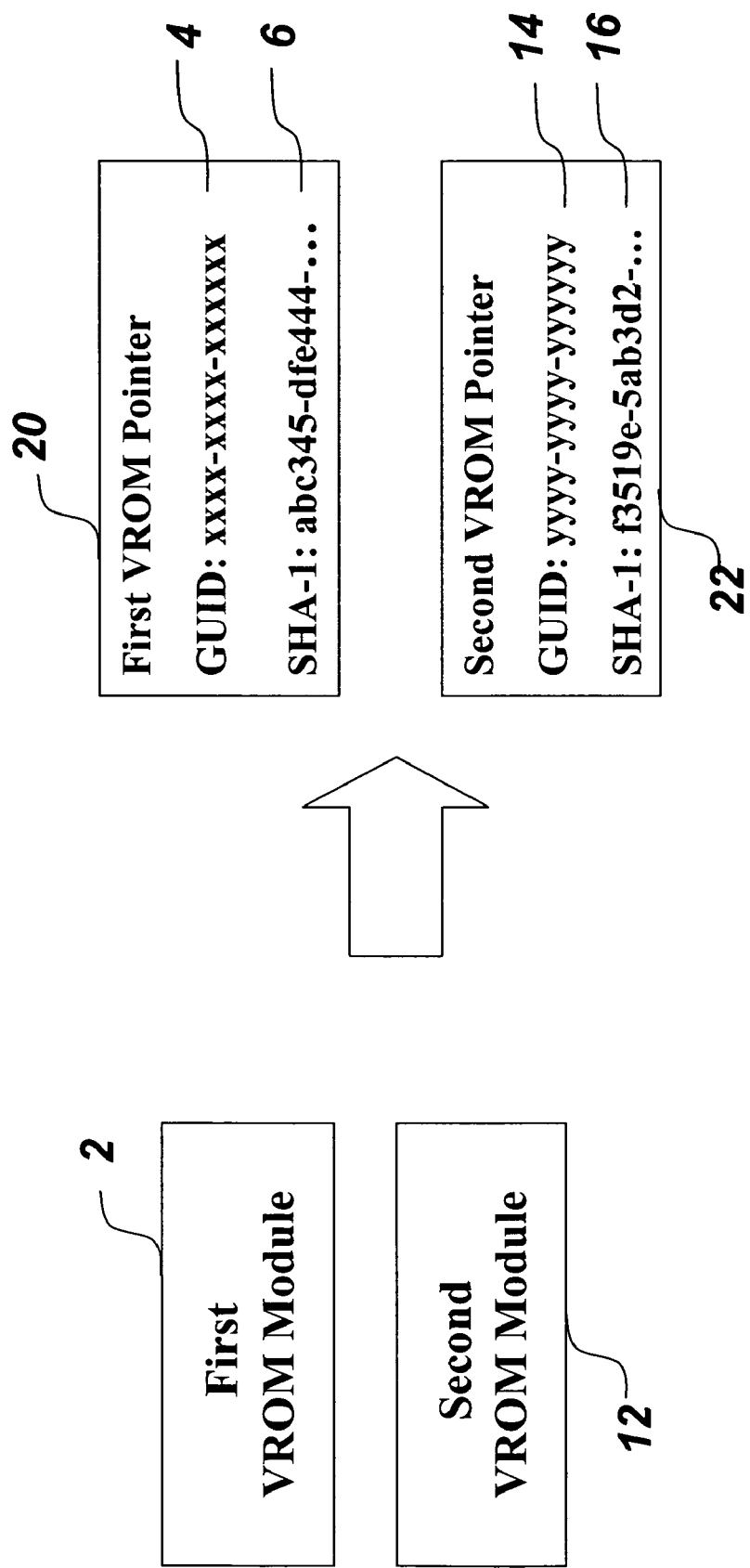
FIG. 1 depicts the correspondence between VROM modules and the generated message digests and GUIDs.

The illustrative embodiment of the present invention increases the amount of firmware available to a computer pre-boot, provides for a secure update mechanism for the firmware, and provides means for creating and accessing a secure storage area. For clarity of explanation, each aspect of the invention is discussed separately in turn below. The illustrative embodiment of the present invention as described herein makes some references to documented API's in Intel's Platform Innovation Framework for EFI ("the Framework"). Translation to an embodiment on top of non-Framework solutions will be apparent to those skilled in the art. In addition, while the discussion focuses on PC's, other non-PC computational devices that include a pre-programmed firmware image stored on a non-volatile memory part are also considered to be within the scope of the present invention.

Before discussing the present invention in detail, it may be helpful to discuss the BIOS and Framework components utilized by the present invention. Intel's Platform Innovation Framework for EFI ("the Framework") is a complete re-implementation of the functionality and capabilities of a BIOS. Whereas a BIOS normally operates in 16-bit real mode on Intel X86 computers, the Framework is capable of running in a 32-bit or 64-bit memory mode, and is not restricted to a particular platform architecture. Also, whereas a BIOS is normally written almost entirely in assembly code, the Framework is written almost entirely in the C programming language.

The Framework provides an implementation of EFI ("The Extensible Firmware Interface"), which is an interface specification that completely abstracts away the details and implementation of firmware that powers on a system from the software that loads and runs an operating system. EFI has been defined as a completely "opaque" interface so that implementations of EFI can be created on top of existing BIOS's as well as from scratch, such as the Framework. "Opaque" in this context means that the caller or client of the interface has no visibility into the internals of the underlying implementation. The only access the caller has is through the interface itself.

EFI introduces a standard set of mechanisms that pre-boot components use in interacting with each other that are also used by the Framework, and are relevant to the different embodiments of this invention. Interactions between components are defined as "protocols," which are C-language API's that are each opaque. Protocols are implemented by "drivers," which are individual components that can be separately loaded into memory and executed. Each protocol has a C-language source code "name," and its own unique identifier (which is implemented as a "GUID" or Globally Unique Identifier) that is used to distinguish it from other protocols at execution time. When a driver is loaded into memory, it describes to the EFI environment the set of protocols that it supports. The EFI environment keeps track of these protocols in an in-memory database, lets other pre-boot code search for these protocols and access them, and thereby finds and executes code in the driver that has "exported" these protocols, without any knowledge of the underlying implementation of the protocol in the particular driver.

This opaque style of interaction between components should be familiar to those who are conversant with COM or CORBA. In particular, unique identifiers (GUIDs) are also used in COM to "find" interfaces to components. As with COM and CORBA, EFI has been designed to be "extensible". New protocols may be defined, and new implementations of existing protocols may be created. In either case, these extensions fit into the underlying environment in a uniform manner.

The concept of drivers is familiar to those who are conversant with today's operating systems, where many different types of hardware need to be supported by software in a unified manner. In these operating system driver environments, common API's are defined for different classes of hardware devices. These common API's hide the details of underlying hardware differences, while different drivers that implement the same API are responsible for handling the hardware variations.

In addition to the standard set of mechanisms for interactions between pre-boot components that is defined by EFI, the illustrative embodiment of the present invention leverages certain extensions defined only in the Framework. The Framework introduces the concept of a "Firmware Volume", which is a flat file system specifically defined for storage directly in a ROM part. The Firmware Volume defines a set of protocols for interaction with this file system. In the Framework, all files stored in a ROM image are stored in Firmware Volumes. Firmware Volumes are therefore generated during the build procedure for the Framework.

One of the extension protocols defined in the Framework Firmware Volume specification is the "GUIDed Section Extraction Protocol." This protocol is defined in such a way that a vendor can extend a Firmware Volume with newly defined "sections" (which are portions of files) whose representations are completely opaque. The way in which this extension occurs is that the section header for a file in the Firmware Volume contains a GUID, which is used by the Firmware Volume code to locate a driver that implements the "GUIDed Section Extraction Protocol." This driver is invoked through the protocol, and transforms the opaque representation as the file is extracted from the Firmware Volume and placed in memory. Examples of possible transformations include the decryption of the opaque representation or the checking of a digital signature on the opaque representation.

Although many of the examples contained herein refer to a Framework environment, it should be understood that the present invention may also be practiced with more traditional BIOS components by making adjustments that would be apparent to those skilled in the art to the Framework description.

The illustrative embodiment of the present invention uses a combination of a unique identifier and a message digest embedded in a ROM image during the build process to securely identify firmware modules not stored in the ROM. Other conventional solutions provide for secure ways of adding firmware that can be accessed pre-boot, primarily to a hidden or secured disk partition, but these other solutions do not require the firmware to be present at the time of the build for the ROM image. The use of SHA-1 or other comparable message digest algorithm makes it extremely difficult to create a different module that will generate the same message digest. Since the message digest is embedded in the ROM image, changing the message digest itself requires updating the ROM part. Once the message digest has been embedded in the ROM image, there are a variety of existing ways to detect or prevent tampering of the ROM image, such as TPM hardware and flags that make regions of a flash part read only, that are outside the scope of this invention but known to those skilled in the art. Because the message digest is embedded in the ROM image, if the ROM image is secure and cannot be tampered with, then the Virtual ROM modules are all practically secure and cannot be surreptitiously altered. Recursive solutions are also possible, in that a Virtual ROM module can itself contain "Virtual ROM pointers" to yet other Virtual ROM modules that are stored elsewhere. The security of the present invention is transitive to all of the Virtual ROM modules with the result that there are few limitations to the amount of firmware that can be made available to a pre-boot environment securely, so long as all of the firmware is available at the time of the build process.

The use of a unique identifier for each Virtual ROM module also provides location independence for the Virtual ROM modules. Each Virtual ROM module may be stored in multiple locations—on disk, on a CD-ROM, on a local area network, or over the Internet. Because the message digest algorithm provides a secure way of verifying the module, neither the locations themselves, nor the mechanism for transporting the module from one of the storage locations to the memory on the PC, are required to be secure.

The first step in providing additional firmware to a computer pre-boot is a design decision on what should be included in the actual ROM image and what should be left out of the actual ROM image. The information left out of the actual ROM image is packaged into one or more separately accessible Virtual ROM modules. For performance reasons, the software necessary to boot a PC along its most common path is frequently left in the actual ROM. However, other software not normally used, such as a Setup UI, support for alternative languages, unusual boot options, recovery or re-flashing firmware, as well as numerous possible pre-boot applications and utilities, may be placed outside the actual ROM in Virtual ROM modules.

The Virtual ROM modules may be Framework "Firmware Volumes," which are single packages that constitute a flat file system including a variable number of files. Each of these included files can be any kind of file supported in the Framework. An advantage to a Framework Firmware Volume is that there exists Framework firmware (drivers) to support access to the embedded files. However, the Virtual ROM module may be any other kind of file, including data as well as executable code. As described above, a design decision may result in multiple levels of nesting for the Virtual ROM modules. In other words, some Virtual ROM modules may contain Virtual ROM pointers to other Virtual ROM modules.

For each such Virtual ROM module, a Virtual ROM pointer which includes a SHA-1 message digest, and a 128-bit GUID (globally unique identifier) is generated. The message digest and GUID may be generated using any of a number of well-known algorithms. Generated GUID's are widely used in the Framework, but are also used elsewhere in computing. GUIDs and SHA-1 message digests generate a value with an extremely low probability of being replicable. FIG. 1 depicts the correspondence between VROM modules and the generated message digests and GUIDs. For a first VROM module 2 a first VROM logical pointer 20 which includes a GUID 4 and message digest 6 are generated associated with and based on the first VROM module respectively. For the second VROM module 12 a separate unique VROM logical pointer 22 which includes a GUID 14 and message digest 16 are generated.

Figure 2:
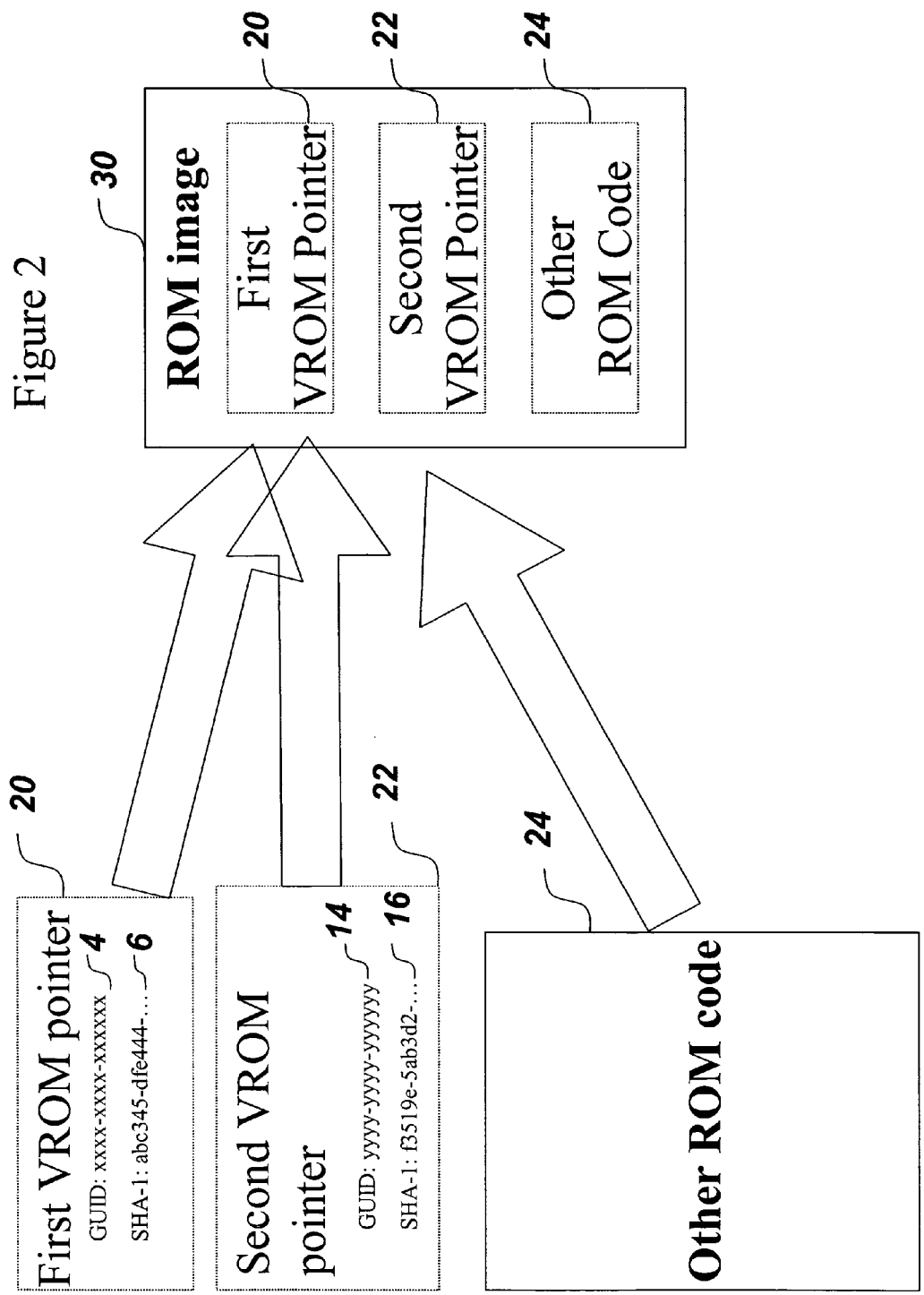
FIG. 2 depicts the use of the VROM logical pointers in the building of the actual ROM image.

Following the generation of the GUIDs and the message digests for the Virtual ROM modules, the actual ROM image is built from standard ROM code and Virtual ROM pointers. The build process is depicted in FIG. 2. The first VROM logical pointer 20 to the first VROM module 2 includes the generated GUID 4 and message digest 6 associated with the first VROM module. The second VROM logical pointer 22 to the second VROM module 12 includes the generated GUID 14 and message digest 16 associated with the second VROM module. The first VROM logical pointer 20 and second VROM logical pointer 22 along with regular ROM code 24 is used to build the ROM image 30. The other ROM code 24 that is added to the ROM image 30 is the ROM code that the designer feels is best suited for being located on the actual ROM part where it is directly accessible.

The specifics of storing and retrieving the Virtual ROM pointers 20 and 22 from the ROM image 30 depend upon the particular embodiment. In one embodiment based on the Framework, another Firmware Volume (that is in the ROM image) contains "files" of various types. Each of these files is constructed with multiple sections, where each section refers to some particular attribute of a file. Since each such file in a Firmware Volume is uniquely identified by a GUID, this GUID can be the same identifier as the one that is used to retrieve the Virtual ROM module, and the Virtual ROM module becomes, in the sense of a Framework Volume, a "file." Another such section may be implemented using the "Guided Section Extraction Protocol." This section contains a GUID to identify the drivers needed to perform the extraction, as well as an SHA-1 message digest to verify the contents (the GUID having already been included as the identifier for the file). Additionally, other representations may be constructed, both inside the Framework and as part of existing BIOS'es, provided that both the GUID and the SHA-1 message digest are represented.

Figure 3:
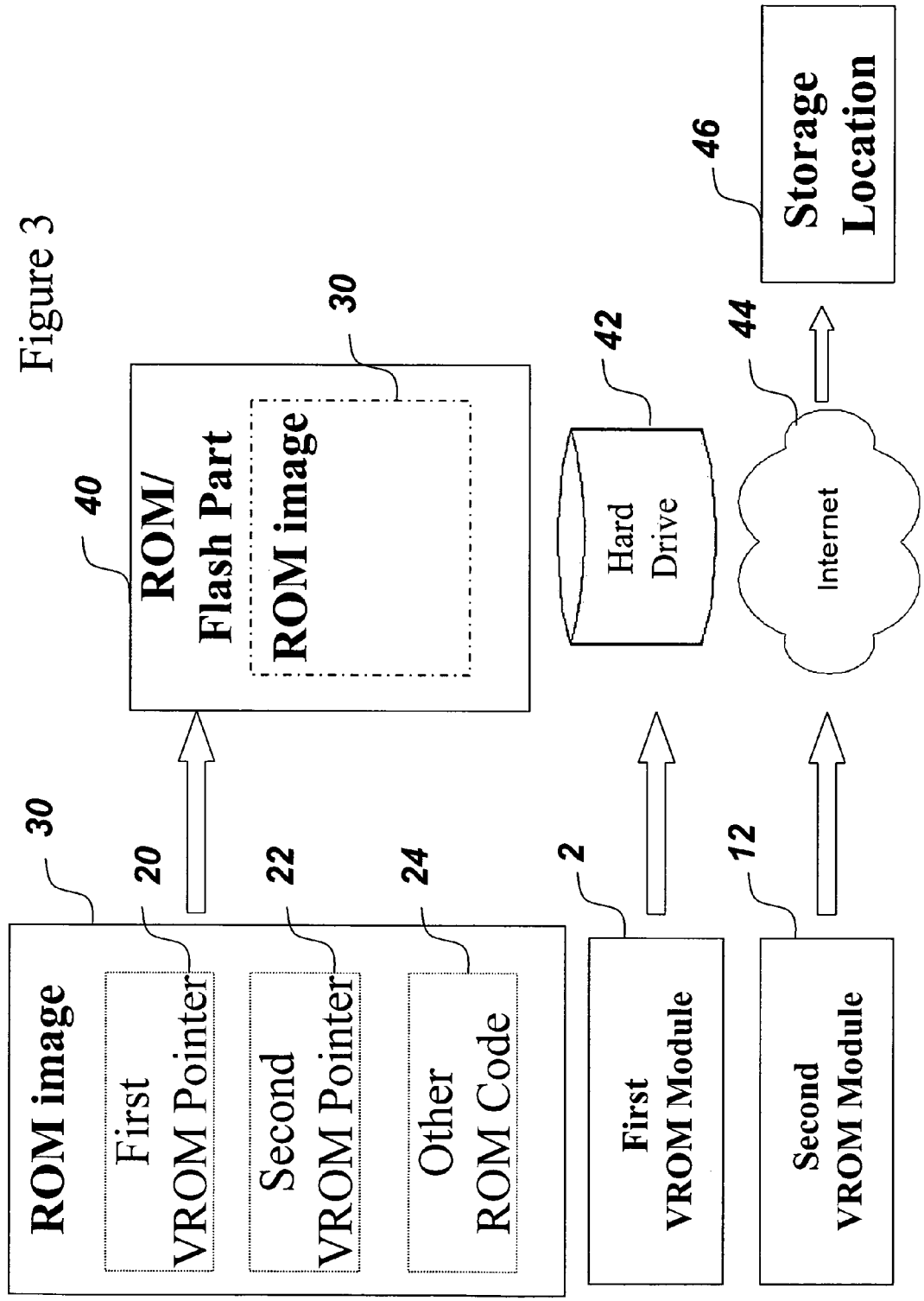
FIG. 3 depicts a view of the distribution process, where the actual ROM image is stored on a ROM part, and the Virtual ROM modules may be stored on a disk or on the Internet.

FIG. 3 shows how the actual ROM image is placed into ROM, as well as showing how the Virtual ROM modules are distributed elsewhere. The ROM image 30 which includes the first VROM pointer 20, second VROM pointer 22, and other ROM code 24, is placed into a ROM part 40 such as flash memory. The actual first VROM module 2 to which the first VROM pointer refers may be located in a hard drive 42 on the same electronic device as the ROM part 40. The second VROM module 12 to which the second VROM pointer refers may be stored on a location 46 accessible over the Internet 44 or some other type of network. It will be appreciated by those skilled in the art that other distributions of the VROM modules to storage locations are possible within the scope of the present invention. It should be noted that the distribution events need not happen all at the same time. While the actual ROM image is necessary to bring up the PC, the Virtual ROM modules may only be made available in some other way at some other point in time. There is also no requirement that there only be a single distribution mechanism for the Virtual ROM modules. Each such Virtual ROM module may be distributed in a variety of different ways.

One example of a distribution mechanism might be appropriate for upgrading a hard drive in a computer. The firmware to copy the drive contents from one hard drive to another is first made available during the firmware build process. It is not, however made part of the actual ROM, but a virtual ROM pointer to it is stored in the actual ROM image. At the time of the disk upgrade, which might be a number of years later, the corresponding Virtual ROM modules are made available on a CD-ROM that must be used to perform the upgrade. Since the files have been previously "included" in the build process, they can be trusted and run from the CD-ROM. Alternatively, the hard drive copying software may be downloaded from the Internet, and verified in the same manner. Another distribution mechanism might be appropriate during the process of building a disk image for the PC. The disk image may include a non-secure disk partition to which the Virtual ROM modules can be copied.

Figure 4:
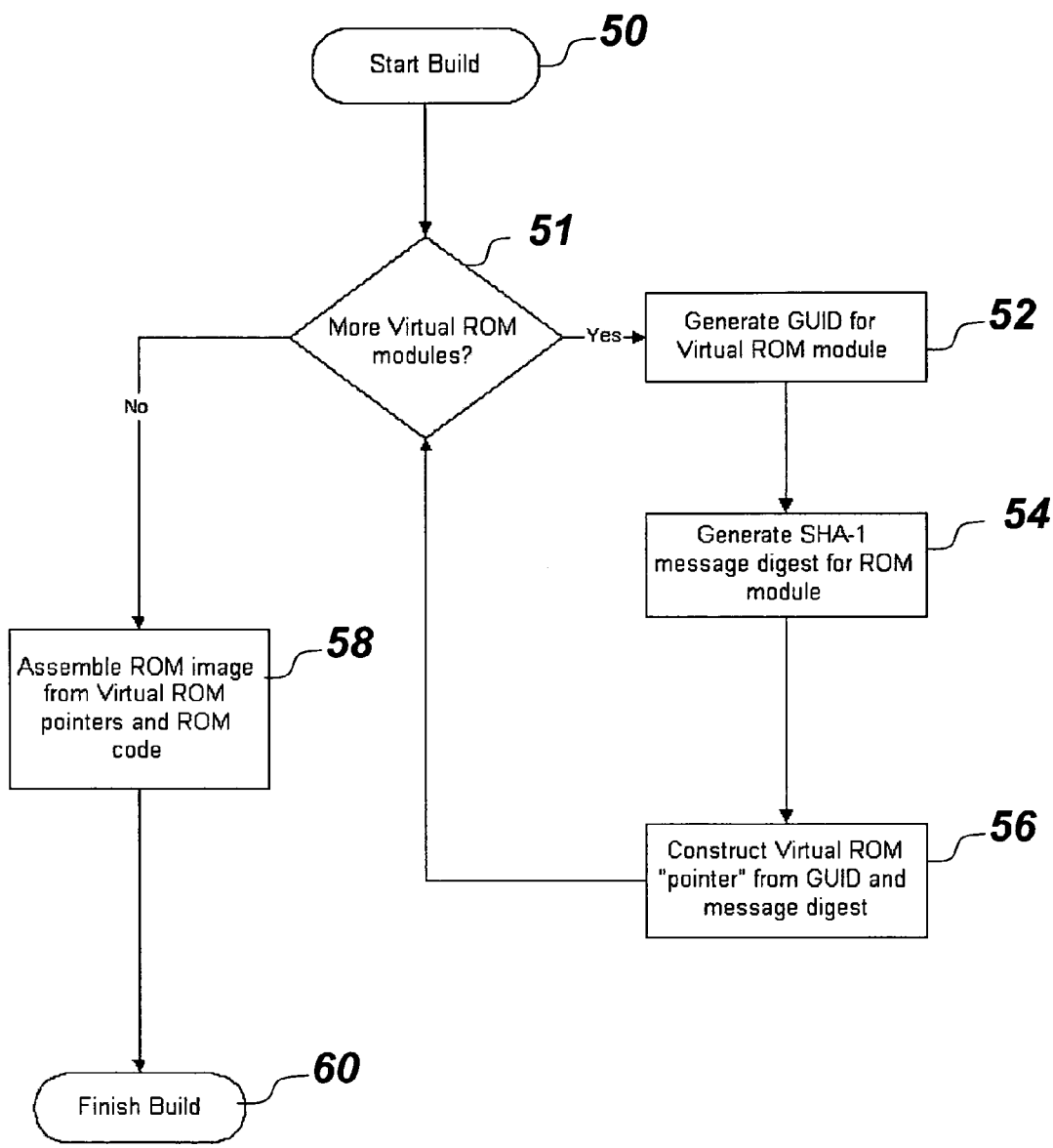
FIG. 4 is a flowchart for the build process.

FIG. 4 is a flowchart of the sequence of steps followed by the illustrative embodiment of the present invention to utilize Virtual ROM modules during the build process for a ROM image. The build process 50 begins with a determination as to whether there are any Virtual ROM modules (step 51). If there are Virtual ROM modules, a GUID is generated and assigned to the Virtual ROM module (step 52). A message digest, such as a SHA-1 message digest is then generated for the Virtual ROM module (step 54). A Virtual ROM logical pointer is then constructed from the GUID-message digest pair (step 56). The process iterates until a determination is reached (step 51) that there are no more Virtual ROM modules. A ROM image is then assembled that includes the Virtual ROM logical pointers and the regular ROM code (step 58) and the build process ends (step 60).

Figure 5:
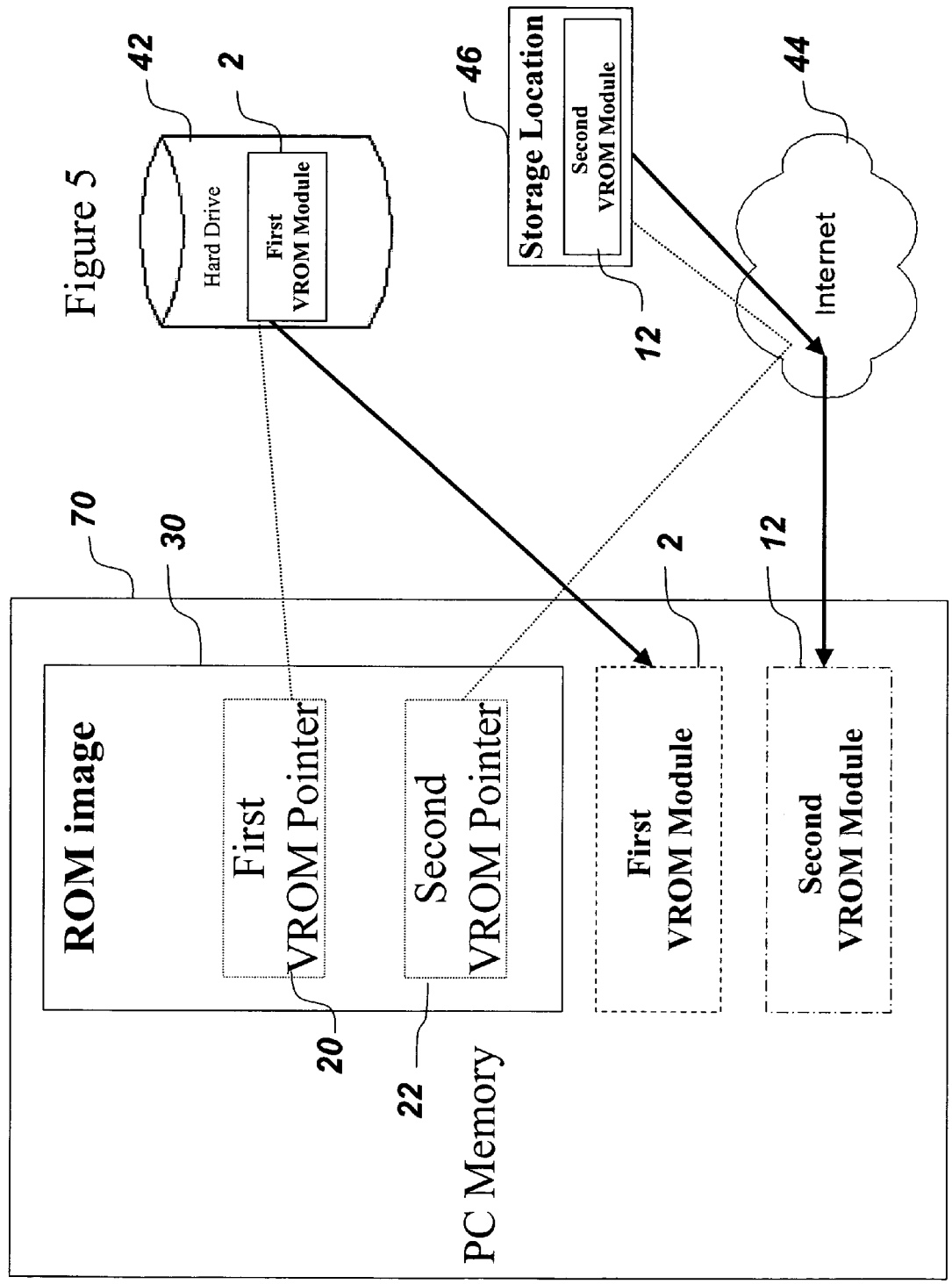
FIG. 5 depicts a view of the retrieval process, where the Virtual ROM "pointers" are used to retrieve the Virtual ROM modules that do not reside in the actual ROM part.

Once the virtual ROM modules have been distributed, they may be retrieved into the memory of the PC or other electronic device on which the ROM part 40 is located. FIG. 5 depicts a view of the retrieval process. The ROM image 30 is loaded into PC memory 70. The VROM logical pointers 20 and 22 in the ROM image 30 indicate the presence and identity of the first and second VROM modules 2 and 12 stored in the hard drive 42 and storage location 46. The first and second VROM modules 2 and 12 are then retrieved and loaded into memory 70 as discussed further below. There may be a variety of reasons to retrieve a particular VROM module, including the execution of some other piece of firmware that is aware of the need to load a particular Virtual ROM module, or a user interaction with some interface that prompts for some firmware to be executed that is not in the actual ROM.

In the Framework-based embodiment where the Virtual ROM pointer is stored as a section in a Firmware volume, the decision to retrieve a VROM module is implemented as a decision to "load into memory" the "file" referred to by the section. In this embodiment, Framework drivers that support the "Guided Section Extraction Protocol" as previously described implement the method described below in the flow chart of FIG. 6. It should be understood that although this description refers to firmware that attempts retrieval of the Virtual ROM module as the "retrieval driver", the firmware may not be implemented as a driver in a non-Framework embodiment.

The retrieval driver has access to a variable stored in non-volatile storage that describes a search path for "where to look" for the drivers. Search paths are commonly used in operating systems to provide a means for a referred-to executable to be found, loaded, and executed in memory. The use of the search path by the present invention is similar, although there are a variety of implementation mechanisms that can support such a search. In a Framework embodiment, the variable is stored in the ROM part as an EFI NVRAM variable that may be updated by the user or some other software at any point in time.

The Retrieval Driver iterates through the search path elements in sequence. The search path represents a "preferred order" of searching for the Virtual ROM module. For each such element in the search path, the driver attempts retrieval of the Virtual ROM module using that element. Each element may be encoded as a "URI template," where a Universal Resource Identifier (or Universal Resource Locator), as is commonly used in browsers and the Internet, incompletely specifies the location of the corresponding file. This incomplete specification may simply be a variable that is filled in with the GUID that is associated with the Virtual ROM module. Once filled in, such a "completed" URI may refer to a file in some directory on a local disk partition, a file that can be retrieved over the Internet using the Hyper-Text Transfer Protocol (HTTP), or some other well-known protocol. Also, in the Framework, the retrieval mechanism for each "scheme" in a URI (the part that identifies "file:" "http:" "ftp:" and so forth) may itself be handed off to a different Framework Driver that understands the particular protocol.

The retrieval attempt with any particular element may fail to find the corresponding Virtual ROM module, in which case an attempt is made to retrieve the next element in the search path. If the retrieval attempt succeeds, the Virtual ROM module is loaded into memory. At this point in time, the message digest for the Virtual ROM module is verified by running the same message digest algorithm as was used during the build process. If there is a match on the message digest for the Virtual ROM module, then the Virtual ROM module is usable. If there is, however, no match on the message digest, the retrieval proceeds to the next element in the search path.

Following the verification of the message digest, a determination may be made as to whether the Virtual ROM module may be stored "closer" to the actual ROM. A definition of "closer" may be a standardized location on a local disk drive that is set aside for caching Virtual ROM modules. If such a location exists, and is specified earlier in the search path than the location that the Virtual ROM module has just been retrieved from, then the Virtual ROM module can be written from memory to this location before it is accessed.

Figure 6:
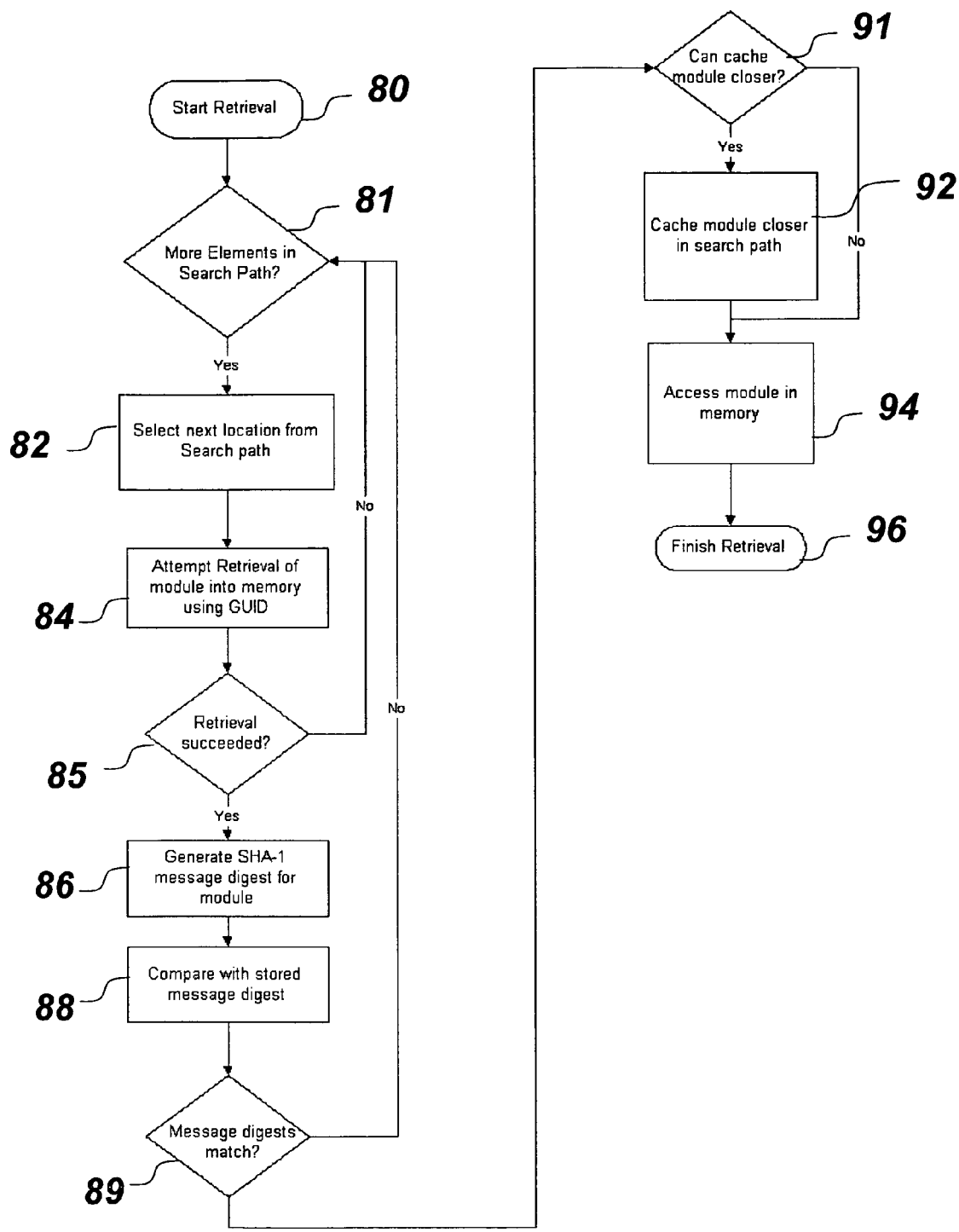
FIG. 6 is a flowchart for the retrieval process.

FIG. 6 is a flowchart of the sequence of steps followed by the illustrative embodiment of the present invention to retrieve Virtual ROM modules. The retrieval process 80 begins by determining whether there are more elements in the search path (step 81). If there are additional elements in the search path (step 81) the next location is selected from the search path (step 82). The retrieval of the Virtual ROM module into memory is then attempted using the GUID for the Virtual ROM module (step 84). If the retrieval succeeded, a SHA-1 message digest is generated for the Virtual ROM module (step 86) and compared with a stored Virtual ROM module (step 88). If the message digests match (step 89), a determination is made as to whether the Virtual ROM module may be cached "closer" (as discussed above)(step 91). If the Virtual ROM module may be cached closer (step 91) it is cached closer in the search path (step 92). The Virtual ROM module is then loaded into memory where it can be accessed (step 94) and the retrieval process ends (step 96).

The illustrative embodiment of the present invention may also be used to provide a mechanism for securely providing updates to firmware. The above-described step of generating unique identifiers and message digests is modified to include the generation of two new attributes—a version number, and a unique identifier for the update validation procedure. For example, in a Framework embodiment, Framework Volume "files" may contain a section that is a version number—a monotonically increasing numeric, with an optional supplied text string. Also, the Framework "Guided Section Extraction Protocol" contains a GUID that refers to the instance of a driver that supports the section extraction. In other words, a separate driver may be used that is also responsible for downloading and verifying the content of the Virtual ROM module. The driver may invoke a nested set of drivers.

Figure 7:
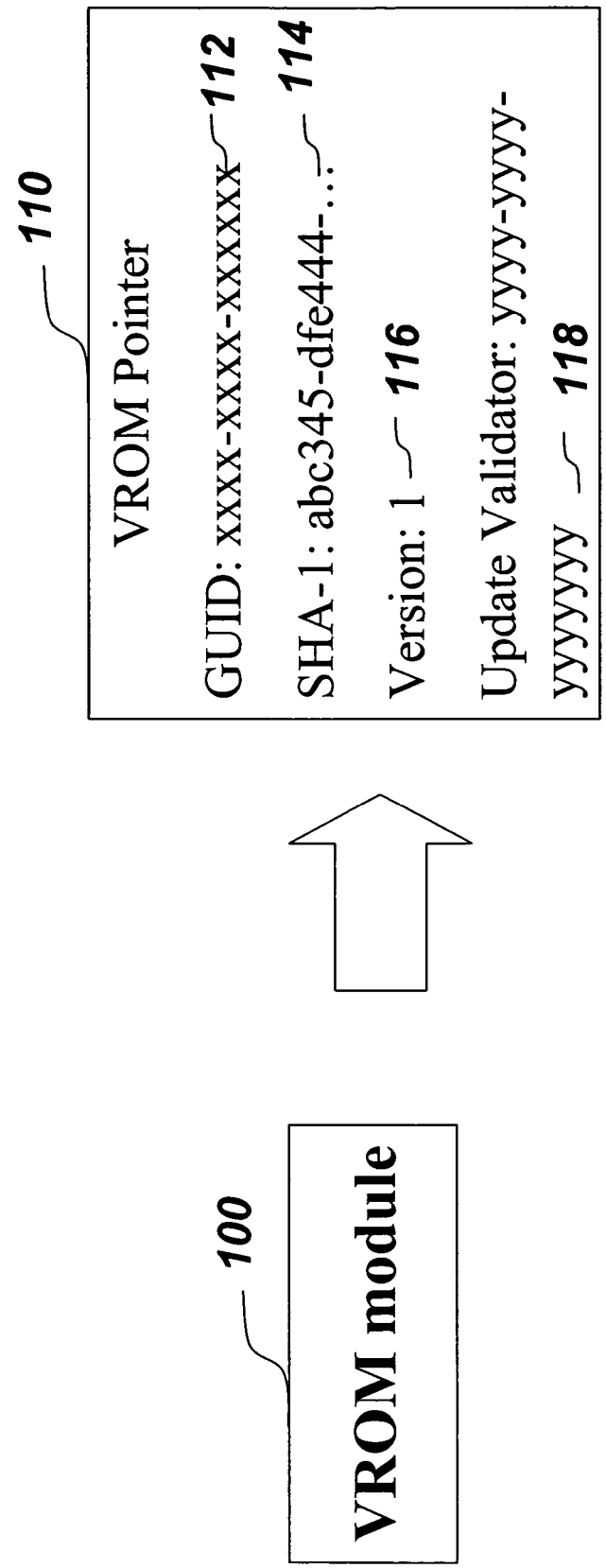
FIG. 7 shows the additional information that is generated for each VROM module during the build process, the version number and the reference to the Update Validator.
Figure 8:
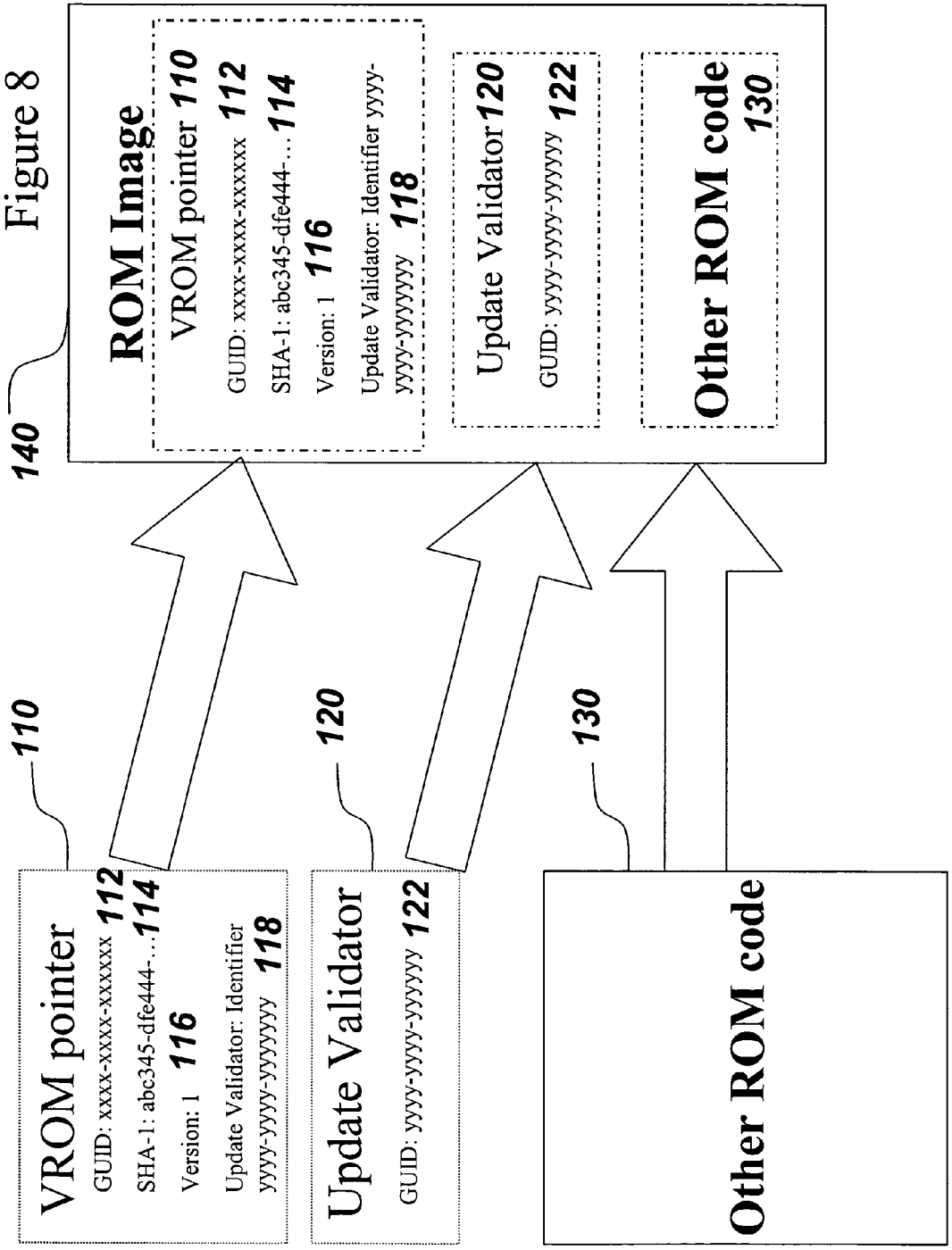
FIG. 8 shows the update validator and the "modified" VROM pointer stored in the ROM image.

FIG. 7 shows the additional attributes that need to be packaged for each Virtual ROM module. A VROM module is used to generate a VROM pointer 110. The VROM pointer 110 includes a GUID 112 and SHA-1 message digest 114. Additionally, the VROM pointer 110 also includes a version number 116 and an update validator identifier 118 that uniquely identifies the update validation procedure. FIG. 8 shows how the corresponding Virtual ROM pointer 110 for the module is packaged into an actual ROM image 140 together with the "Update Validator" code 120, as well as other parts of the actual ROM 130. It should be noted that there is no requirement that the "Update Validator" module 120 be stored in the actual ROM 140—it may be stored as an additional Virtual ROM module. Also, the Update Validation code may be implemented in the Framework as a variant on the Guided Section Extraction protocol drivers (however, at least one set of Guided Section Extraction protocol drivers must be stored in the actual ROM in the Framework implementation).

Figure 9:
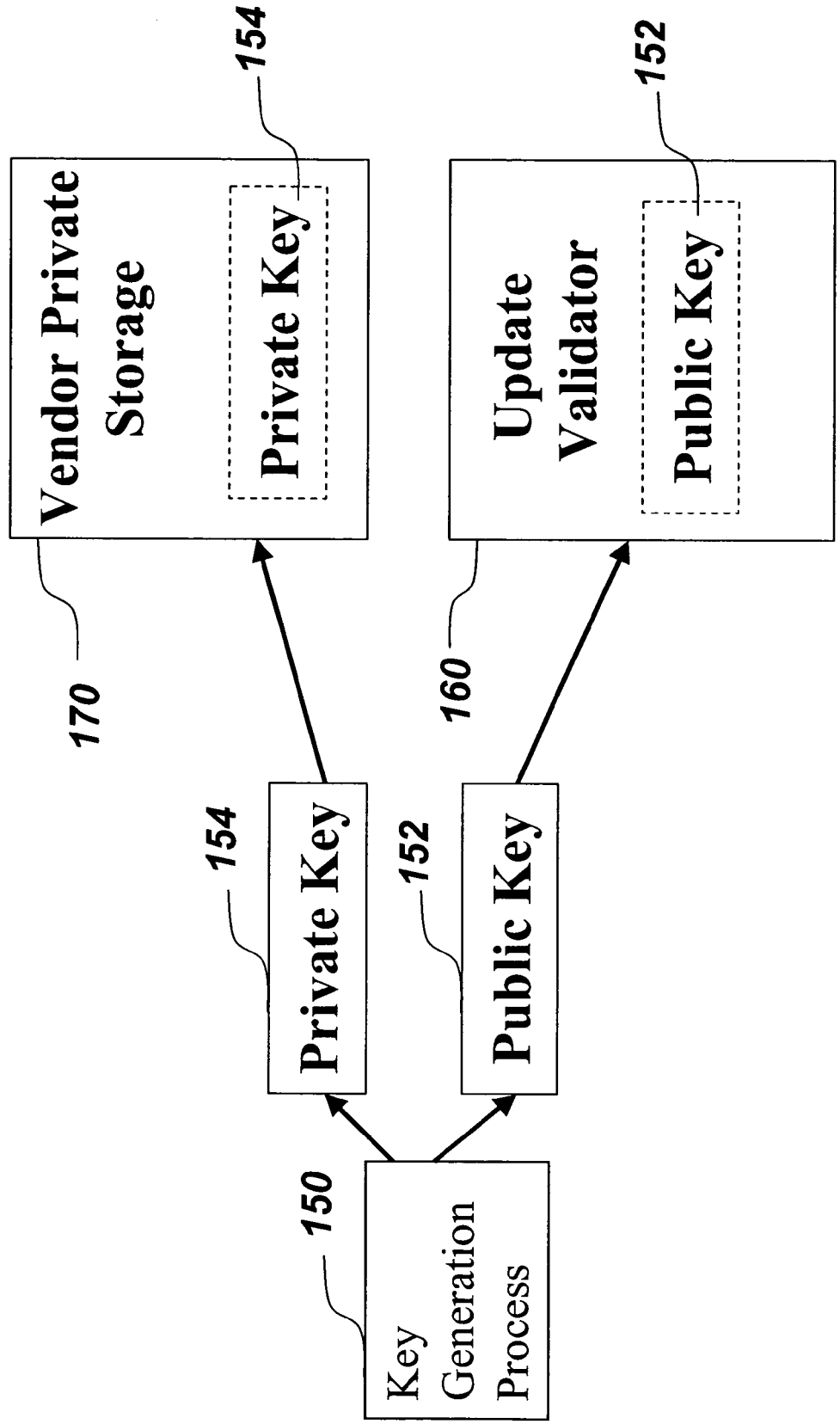
FIG. 9 shows the generation of a public-private key for an Update Validator.

In one embodiment, a PGP-like solution is used for validation. (PGP or "Pretty Good Privacy" is a set of algorithms for digitally signing and/or encrypting e-mail messages that is well known to those conversant in the state of the art). This process is shown in FIG. 9. At the time of the firmware build, for a particular "Update Validator" module, a public-private digital key pair is generated by a key generation process 150. The algorithm for this may be any standard algorithm asymmetric key algorithm such as RSA. The public part of the key 152 is stored with the Update Validator module 160, and the private key 154 is stored with a firmware vendor in its own separate location 170. Additional alternative security mechanisms for update validation are discussed below.

Figure 10:
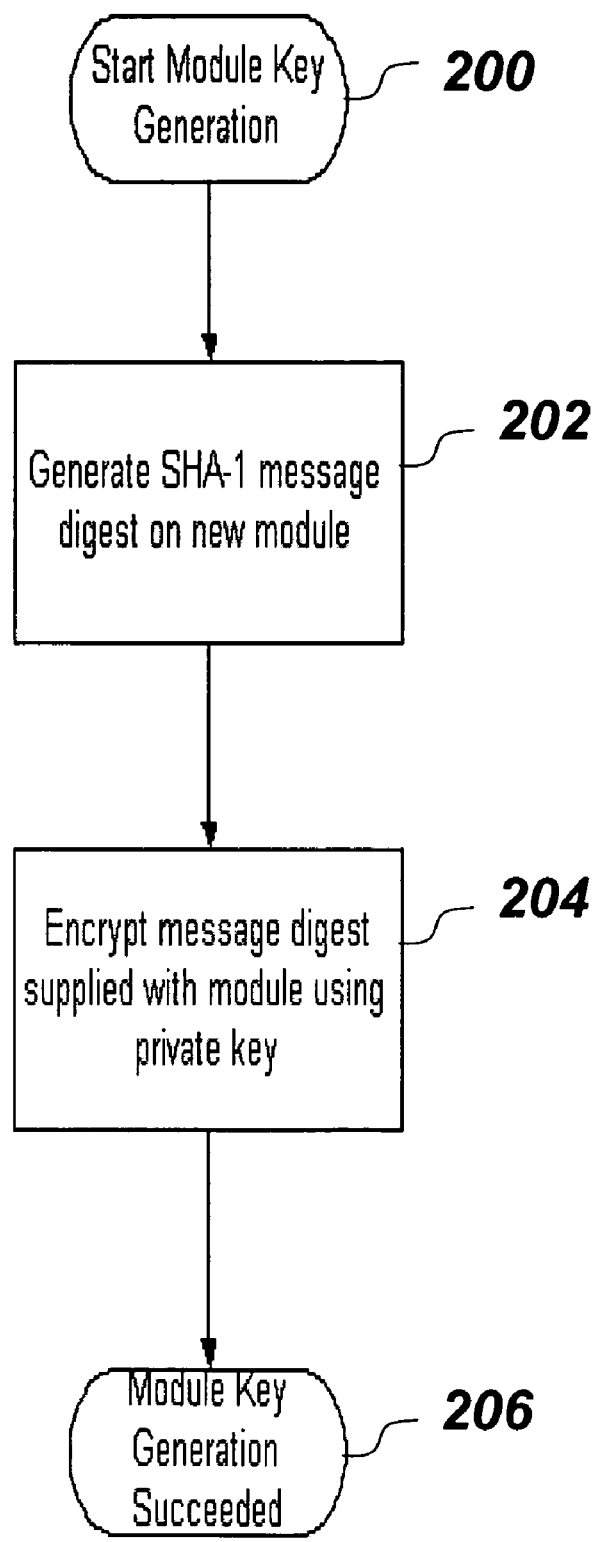
FIG. 10 shows the flowchart for the generation of a "key" that is associated with a module update using the private part of a public-private key pair.

The flowchart of FIG. 10 depicts the use of the private key in generating an update for one or more virtual ROM modules. In order to generate an update with the illustrative embodiment of the present invention, at the time that an update is ready 200, the vendor uses its private key to generate an update "module key." The vendor code runs an algorithm such as SHA-1 over the new module (the new module may include the version number) (step 202), and then uses the private part of the public-private key to encrypt the resulting message digest (step 204). The successful generation results in an encrypted update module key signed by the private key 206. Those skilled in the art will recognize that similar encryption mechanisms may be used in alternate implementations.

Once generated, the update may be retrieved, validated, and then "patched into" the Virtual ROM Module. The retrieval step requires version checking. A prior version of a particular Virtual ROM module may have already been downloaded and made available in a "local cache." One of a number of well-known mechanisms is used to determine when and how to check for a newer version. The mechanism is left to the implementation of the Update Validator. For example, the Update Validator may perform a check for a newer version on a periodic basis. Alternatively a particular location may be "reserved" for updates, and is always checked. These updates may be supplied by code that is run by the Operating System. In the case where no newer version exists, the process described in FIG. 6 above takes place. Irrespective of the mechanism for checking for an update, if a new version has been detected, then it must be validated. This validation process is fundamentally different from the validation process described above for an original Virtual ROM module because the updated Virtual ROM module was not available at the time of the initial build for the Virtual ROM.

Figure 11:
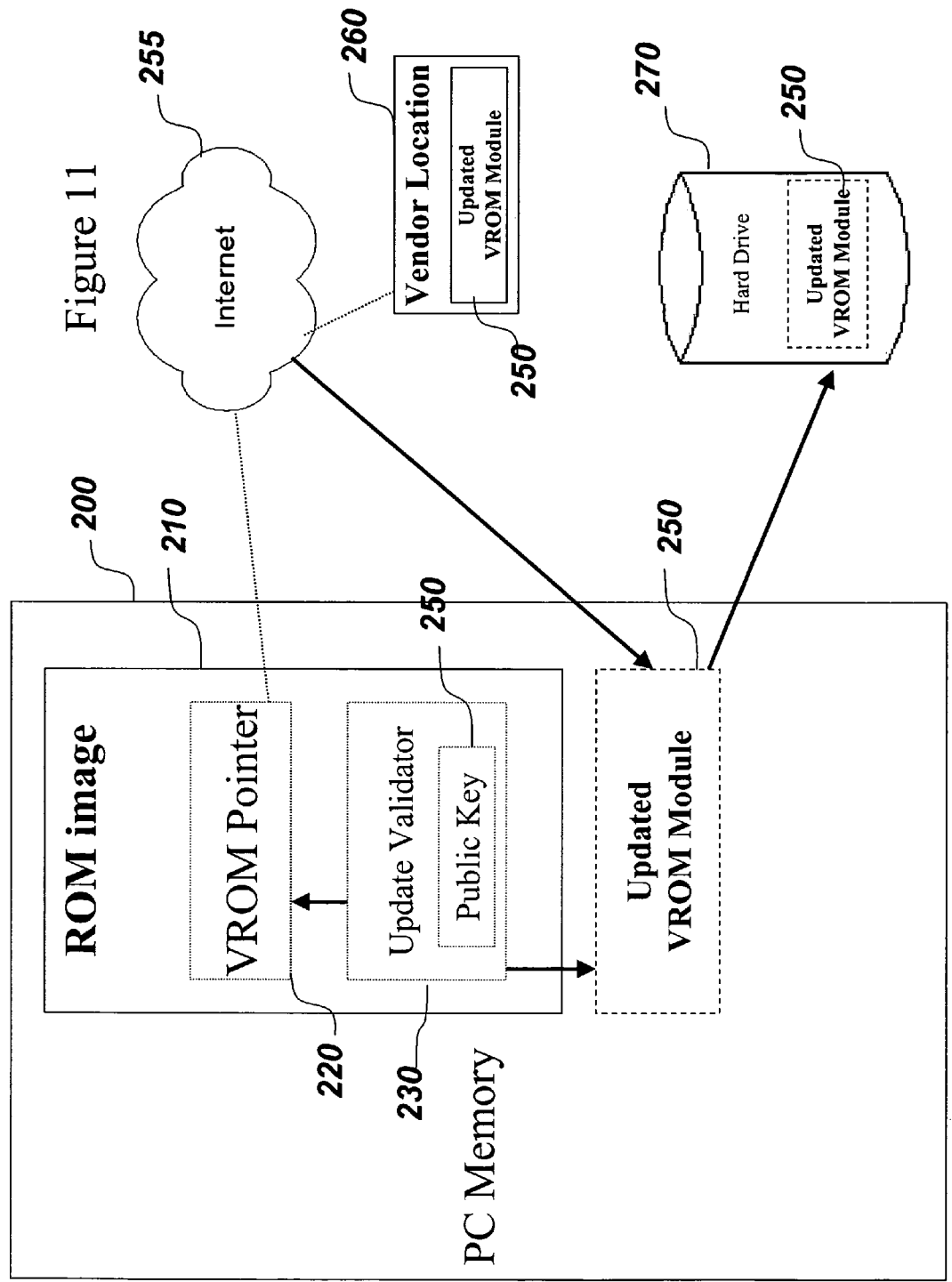
FIG. 11 shows retrieval and validation of an updated VROM module.
Figure 12:
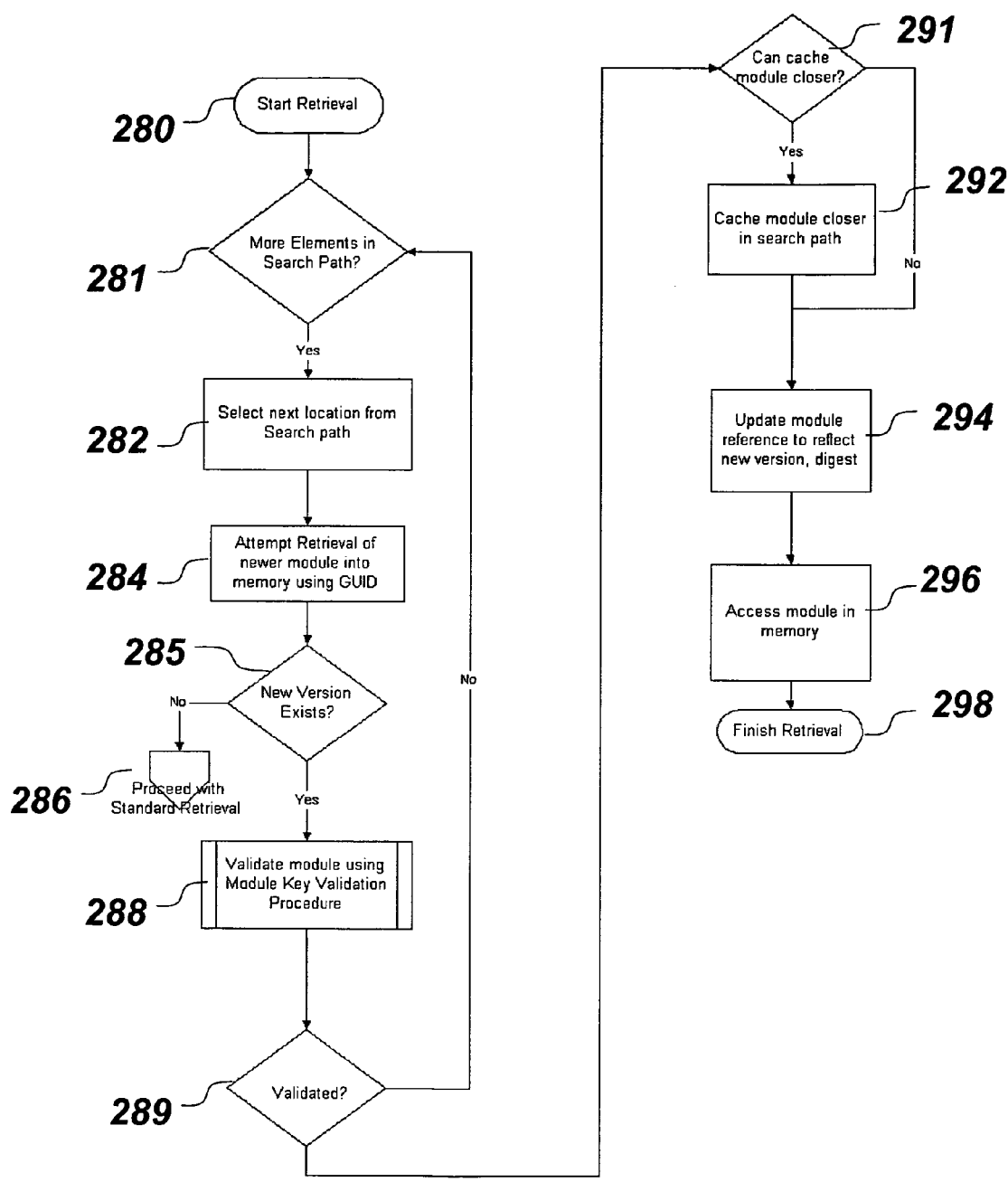
FIG. 12 shows the flowchart for retrieval of an update, including a reference to the flowchart for validating the key.

In one implementation of the present invention, the "module key" that is associated with the update is validated as depicted in FIGS. 11 and 12. The "module key" is decrypted using the public part of the public-private key, stored with the Update Validator. Then the module itself is hashed, and the results of the two are compared for equality.

FIG. 11 provides an overview of one possible implementation of this step where a Virtual ROM pointer 220 in the ROM image 210 that has been loaded into PC Memory 200 logically points to an updated Virtual ROM module 250. The updated VROM module 250 may be stored in a vendor location 260 accessible over the Internet 255. The updated VROM module 260 is downloaded into PC memory 200 and validated by the Update Validator 230 using the public key 235 and is then stored on the local hard drive 270. As discussed previously, this "patching up" of the Virtual ROM pointer requires that the Virtual ROM pointer itself can be updated during this process. For security reasons, the update process also requires that an unauthorized party cannot update the Virtual ROM pointer later in the processing. Also, as discussed above, if the original Virtual ROM build procedure was secure, and some mechanism for preventing later unauthorized updates to the ROM exists, then this update procedure is quite secure, because only authorized code has been executed in order to perform the update. Once the validation process has succeeded, the Update Validator 230 updates the Virtual ROM pointer 220 that is stored in the actual ROM image 210 so that it is consistent with the new module version 250, and then optionally caches the updated module on the local disk 270. The update involves changing the version number and the SHA-1 message digest that is stored with the Virtual ROM pointer 220.

The update process is discussed further in the flowchart of FIG. 12. The update retrieval process 280 begins by determining whether an unsearched update location exists (step 281). If there is an unsearched update process (step 281) the next location from the search path is selected (step 282) and retrieval of the newer module is attempted into memory using the update module GUID (step 284). If a new version exists (step 285) the module is validated using the module key validation procedure (step 288) discussed above with regard to FIG. 10. If a new version of the VROM module does not exist, the standard retrieval process is followed (step 286). In the event a newer module exists, validation is attempted (step 289). In the event the validation is successful, a further determination is made as to whether the new module may be cached "closer" (step 291) as discussed above. If the new module can be cached closer it is cached closer in the search path (step 292). Regardless of the caching, the validator process updates the VROM pointer to reflect the updated module (step 294) and then accesses the updated module in memory (step 296) at which point the retrieval process ends 298.

Figure 13:
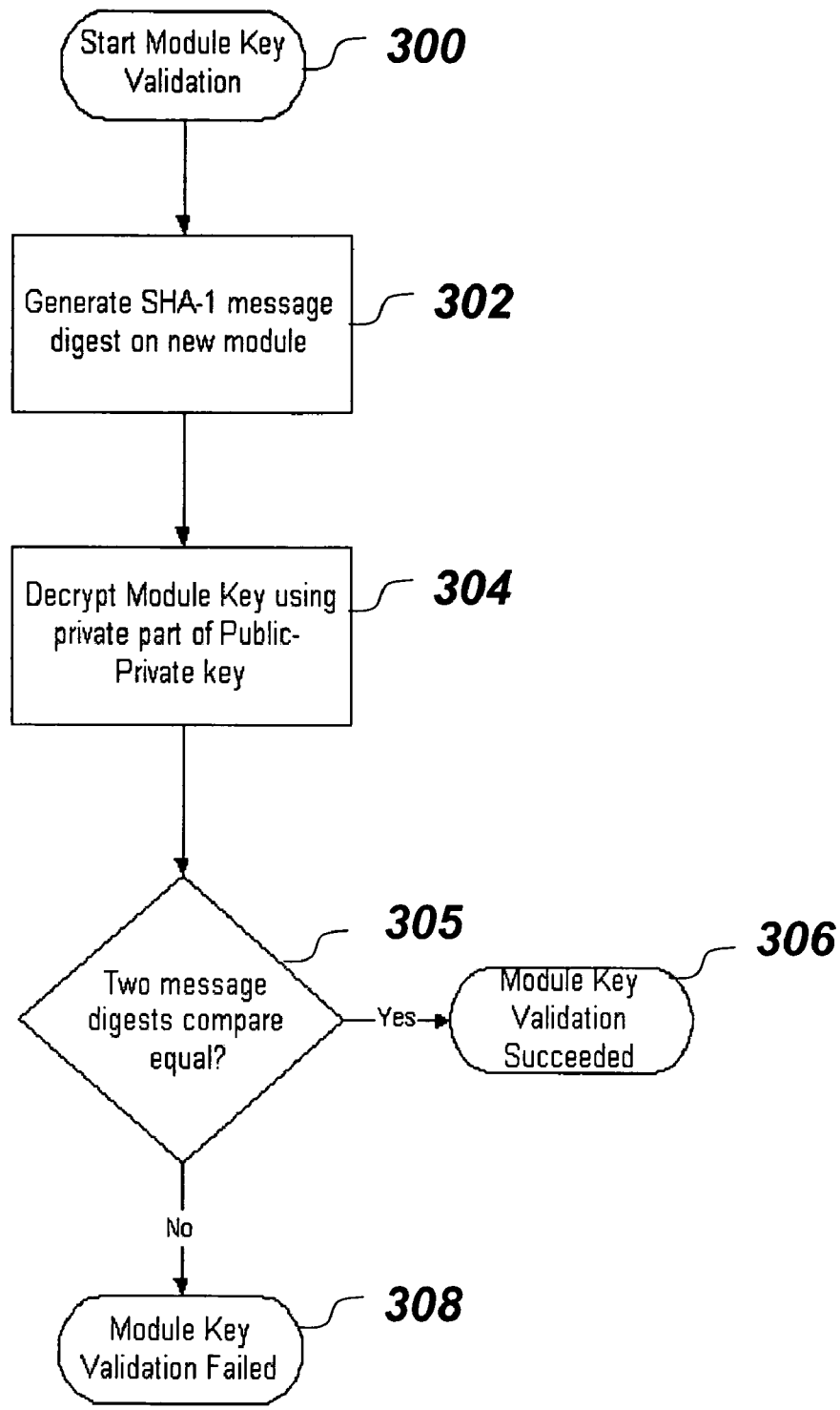
FIG. 13 shows the flowchart for validation of a key.

The sequence of steps followed by the illustrative embodiment of the present invention to validate the module key associated with the update module is outlined in FIG. 13. The module key validation process 300 begins with the generation of a SHA-1 message digest on the new module (step 302). Those skilled in the art will recognize that different implementations may use different message digest algorithms for the encrypting and decrypting processes discussed herein without departing from the scope of the present invention. The module key is then decrypted using the public part of the public-private key (step 304). The two message digests are compared to see if they are equal (step 305). If the comparison reveals equal message digests the validation is a success 306. If the comparison does not reveal equal message digests, the validation is a failure 308.

As noted above, alternative validation techniques may also be employed as part of the update process. A symmetric private key can be used for update validation provided that a portion of the ROM can be hidden from unauthorized reads. The techniques for doing so are discussed below. For this technique, a common private key is generated during the build process, and stored in an encrypted form by the ROM as well as by the vendor. The update "key" can be encrypted and decrypted using the same symmetric key. Alternatively, a secure tunnel for communication using TLS or SSL can be created with a trusted server to download the update. The validation is then based on the fact that communication is occurring with a trusted party, rather than on any message digest that is delivered with the update itself.

The illustrative embodiment of the present invention may also be used to create and access a secure storage area for firmware. A piece of secure storage that is not located in the ROM image is created by keeping a secret key hidden inside the ROM image for encryption or signing. The secure storage may be referred to and accessed much the same way as any virtual ROM module described above is referenced and accessed, but requires an additional unique machine identifier if the storage area is somewhere other than on the local disk.

In a Framework environment, a single Firmware Volume may be used for secure, encrypted storage for all firmware code that wishes to use the storage. The use of a Firmware Volume means that the storage is read in from a non-ROM location as a single unit, and written back out as a single unit. Other solutions using multiple Firmware Volumes will also become immediately apparent. These additional Firmware Volumes may either be referred to by the actual ROM, or by the first Firmware Volume in a recursive manner as described above. Also, each such Firmware Volume can have a flag that identifies whether it is encrypted or simply write-disabled.

The illustrative embodiment of the present invention may reserve storage during the build process. During the build procedure for the Virtual ROM, specific files are marked as requiring encrypted storage. Each of these files acts as a placeholder for some encrypted storage area that is ultimately used by a particular piece of firmware code. The build procedure combines all of these placeholder files into a Firmware Volume, generates a message digest for the Firmware Volume using the SHA-1 algorithm, and stores a reference (or Virtual ROM pointer) to this Firmware Volume in the main Firmware Volume for the ROM part. This Virtual ROM pointer contains, as before, the unique identifier for the referenced (encrypted storage) Firmware Volume, and a GUID to indicate the drivers that will be accessed to retrieve the Firmware Volume. In addition, it contains two flags, one showing that it should be encrypted during run-time, and the second indicating that it has not yet been encrypted.

The build procedure for the actual ROM also reserves space for two additional variables: a machine identifier, and an encryption key. The space for the machine identifier is placed in a Firmware Volume that is marked as write-disabled at pre-boot time, while the space for the encryption key is placed in a Firmware Volume that is marked as read-disabled at a pre-boot time (the read and write disabling is described in greater detail below). Subsequently, the pre-boot code may decide to retrieve the Firmware Volume that is to contain the encrypted storage the first time. In looking at the Virtual ROM Pointer, the pre-boot code determines that the file being referred to is marked for encryption, but has not yet been encrypted. In this situation, the pre-boot code retrieves a first version of the file using the same mechanisms described above. Since the storage has not yet been used, a common instance of the corresponding Firmware Volume that was constructed during build time may be made available to all running instances of the pre-boot code. The Firmware Volume is loaded into memory as before and made accessible to pre-boot code in the same manner as other Firmware Volumes. However, the driver that provides access to this Firmware Volume also keeps track of a "dirty" flag (to indicate that it should be written back to a persistent storage medium) as well as the location of the Virtual ROM pointer, since the latter will need to be updated. Any updates to files in this firmware volume cause the dirty flag to be set.

Figure 14:
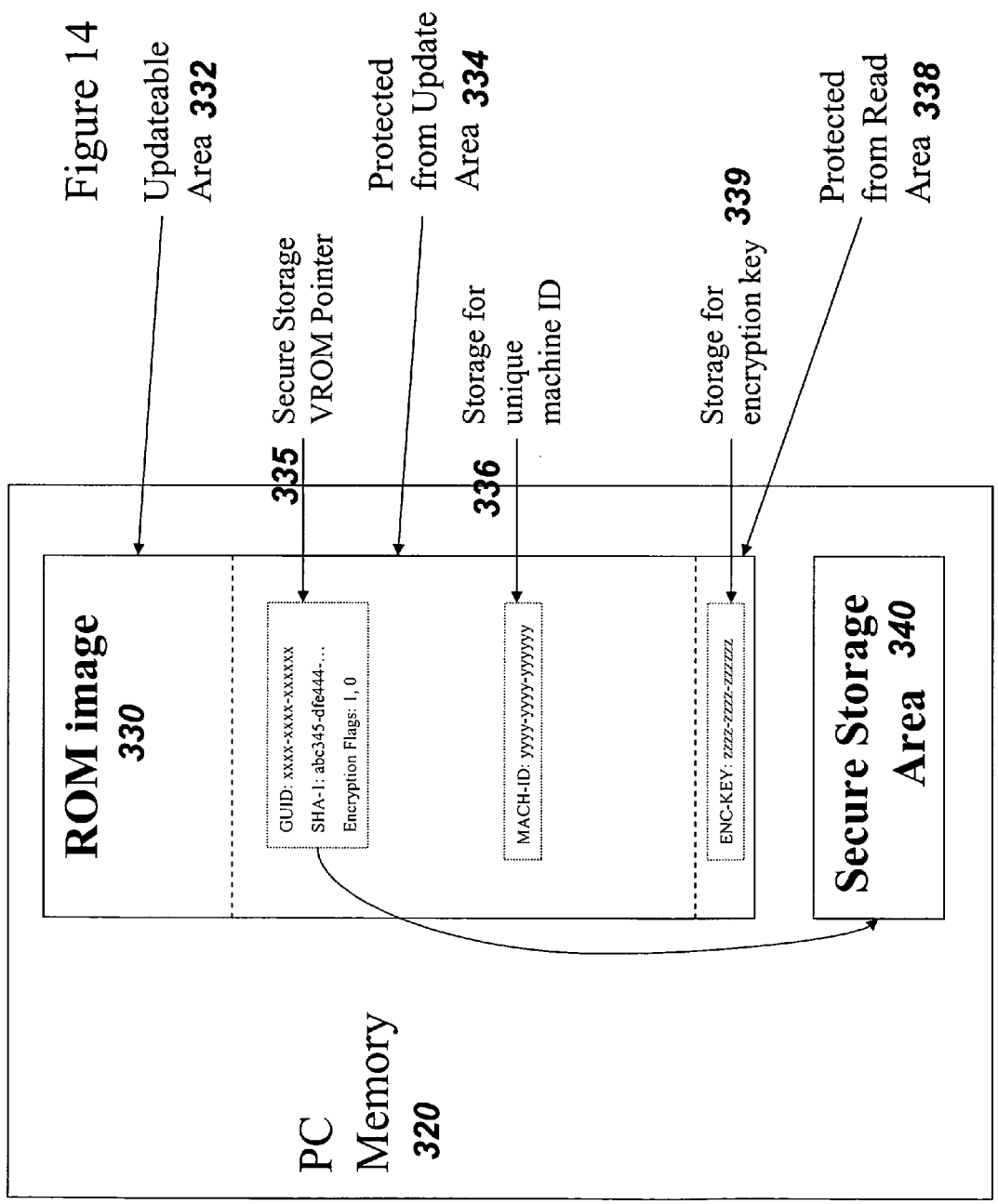
FIG. 14 shows the breakdown of the components used to create a secure storage area for firmware.

FIG. 14 shows how memory 320 is broken down once the Secure Storage Area (i.e., the Firmware Volume that embodies the Secure Storage Area) is read in the first time, and the Machine ID and the Encryption key have been generated. The memory area 320 includes the ROM image 330 and a secure storage area 340. The ROM image includes an updatable area 332 and an area protected from updating (write-protected) 334. The area protected from updating 334 holds a secure storage VROM pointer 335 and storage for a unique machine ID 336. The secure storage VROM pointer includes a GUID for the VROM module, a message digest 337 and encryption flags 333. The ROM image also has an area that is protected from reading (read-protected) 338 that includes storage for an encryption key 339.

At some point in time (although not necessarily with every write to the Firmware Volume), a decision is made by the pre-boot code to write out the modified Firmware Volume to some storage medium. The decision to write is driven by the dirty flag described in the previous section. The pre-boot code detects that a machine identifier and an encryption key have not been generated. It generates the machine identifier and encryption key and saves them in their respective storage locations in actual ROM. Any suitable mechanism for generating unique values can be used to generate these identifiers. One solution is to use a GUID for both.

Following the generation of the identifiers, the illustrative embodiment of the present invention then detects in the Virtual ROM pointer that the Firmware Volume should be encrypted, but has not yet been. It encrypts the Firmware Volume using the encryption key and generates an SHA-1 message digest on the results. For the purposes of this invention, any suitable encryption algorithm may be used, including Blowfish, DES/3DES, IDEA, etc.

Figure 15:
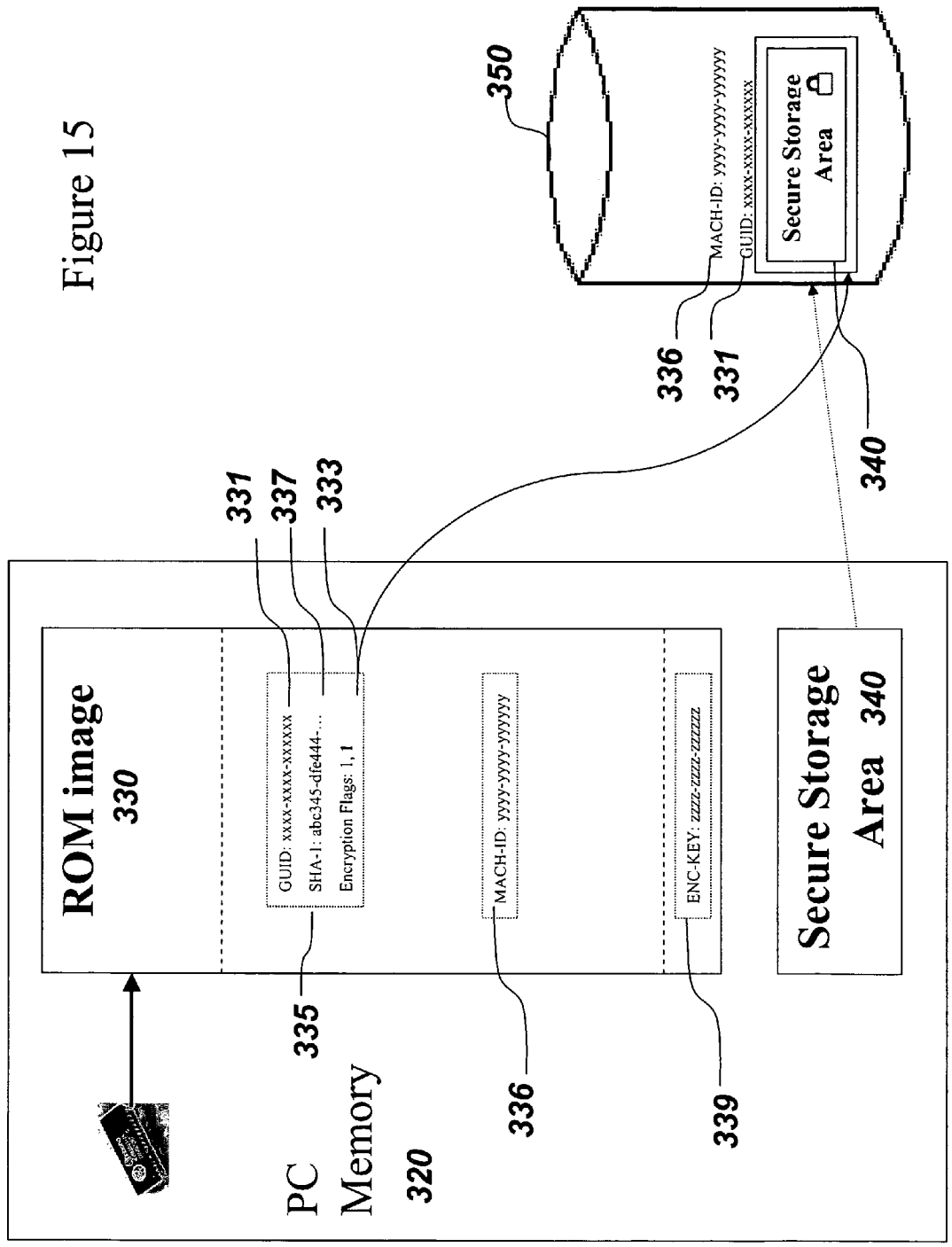
FIG. 15 shows the encryption and saving of the Secure Storage Area to a secondary storage location (in this case, a disk drive)

Following the encryption of the firmware volume and generation of the message digest on the results, the pre-boot code then must determine where to write the encrypted Firmware Volume. One location for the encrypted Firmware Volume is a directory on the local disk drive 350 as depicted in FIG. 15. However, the encrypted Firmware Volume 340 may alternatively be stored on a local network server, over the web or in another accessible location. A combination of the machine identifier 336 and the GUID 331 identifying the Firmware Volume file is used to write the file to a unique location. At this point in time, the pre-boot code updates the Virtual ROM pointer 335 in actual ROM both to indicate that the firmware volume 340 has been encrypted, and to reflect the newly generated message digest 337.

Figure 16:
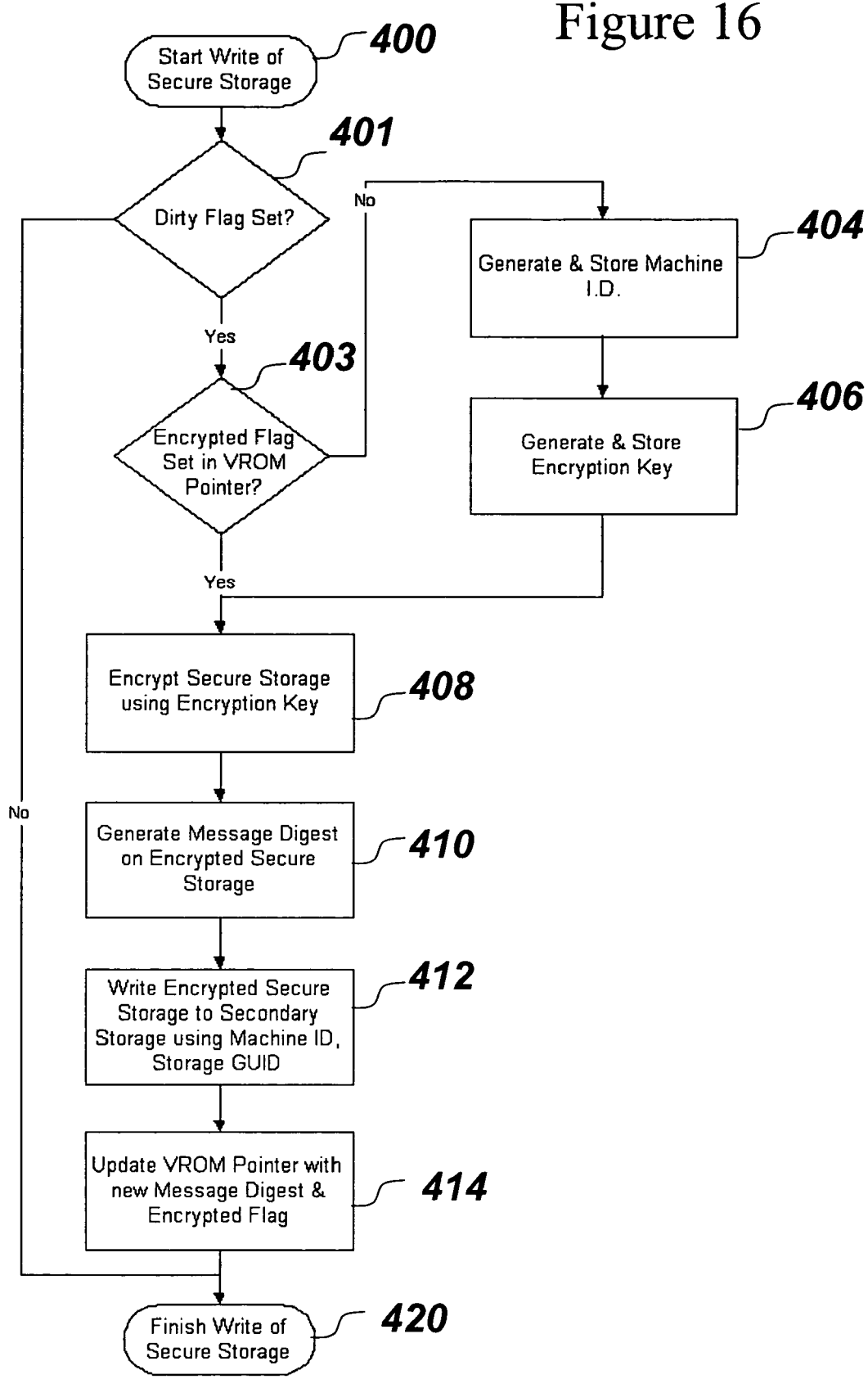
FIG. 16 shows a flowchart for first and subsequent writes of the secure storage.

The process of writing to secure storage is depicted in the flowchart of FIG. 16. The process of writing to secure storage 400 begins by determining whether a dirty flag is set (step 401) that indicates that the firmware volume should be written back to persistent media. If the dirty flag is not set, the process ends 420. If the dirty flag is set, a determination is made as to whether the encrypted flag 333 is set in the VROM pointer 335 (step 403). If the encrypted flag is set (step 403), the secure storage area is encrypted using the encryption key (step 408). If the encrypted flag is not set (step 403) a machine ID is generated and stored (step 404) and an encryption key is generated and stored (step 406). The encryption key is then used to encrypt secure storage (step 408).

Following the encryption of secure storage (step 408), a message digest is generated on the encrypted secure storage (step 410). The encrypted storage is then written to secondary storage using the machine ID 336 and storage GUID 331 (step 412). After the write to secure storage (step 412), the VROM pointer is updated with the new message digest and the encrypted flag (step 414) and the write process ends 420.

Figure 17:
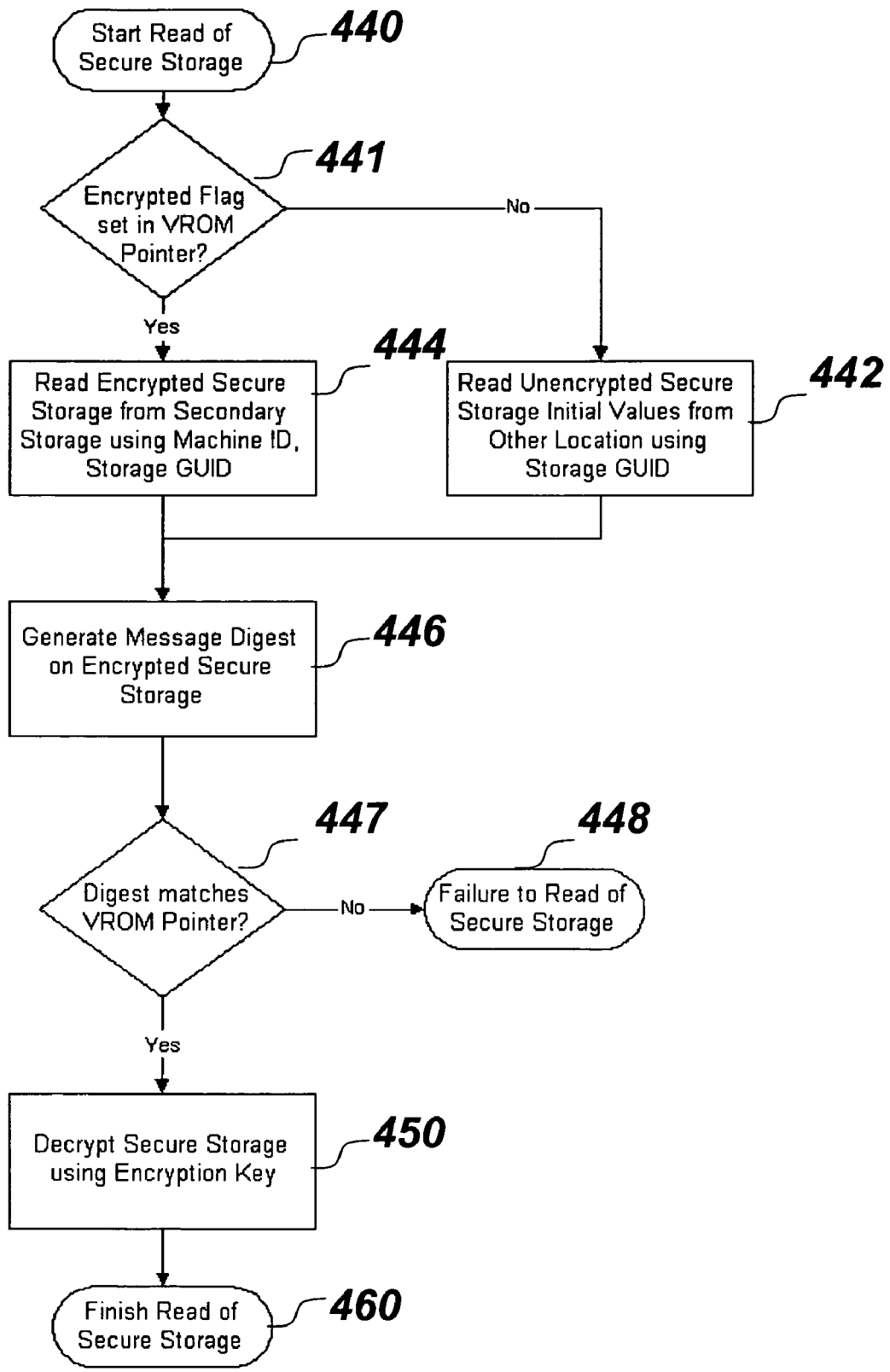
FIG. 17 shows a flowchart for first and subsequent reads of the secure storage.

The illustrative embodiment of the present invention supports the pre-boot code retrieving the encrypted Firmware Volume as set forth in the flowchart of FIG. 17. The read of secure storage process 440 begins with the pre-boot code determining whether the encrypted flag has been set in the VROM pointer (step 441). If the pre-boot code detects from the flag in the Virtual ROM Pointer 335 that the firmware volume 340 has been encrypted (step 441), it retrieves and reads the Firmware Volume using the combination of the machine identifier 336 and the GUID 331 (step 444). If the encrypted flag is not set in the VROM pointer, the pre-boot code reads unencrypted secure storage initial values from other locations using the storage GUID (step 442). Once the firmware volume has been read (step 442 or step 444) a message digest is generated on the secure storage (step 446). The generated message digest is compared and validated (step 447) with the message digest in the VROM pointer. If there is a mismatch the secure storage read fails (step 448). If the validation succeeds, the pre-boot code then decrypts the Firmware Volume (step 450) and makes it available in memory 320 and the read process ends 460. As before, a dirty flag is kept to determine if modifications have been made to the Firmware Volume 340. The modified firmware volume is written out to storage on a second or subsequent iteration in the same manner as the initial writing except that the encryption key and machine identifiers do not need to be re-created.

At a certain point in the pre-boot processing, the illustrative embodiment of the present invention locks various parts of the actual ROM to prevent further tampering or access. The exact mechanism for this depends on the hardware. This description focuses on the particular point in time that this locking occurs. This point in time may be the same as or after the modified Firmware Volume is flushed out by being written to storage.

One EFI-compatible point in time to read-disable the storage is during "Exit Boot Services," which is a point in time where an O.S. Loader notifies the EFI environment that it is about to proceed with loading an Operating System. While this is fairly simple to implement (drivers can be notified during Exit Boot Services), the risk here is in the trust-level of the O.S. Loader code. If the O.S. Loader code has been made available as part of the firmware build process in the same manner as other Virtual ROM modules, then this solution is quite secure. If, on the other hand, the O.S. Loader code is accessed in some other manner, such as using Legacy boot protocols, then the optimal point in time to read-disable the actual ROM storage is just before the boot options are considered. In Framework terminology this may be referred to as the transition between the "DXE" (Driver Execution Environment) and "BDS" (Boot Device Selection) phases.

The illustrative embodiment of the present invention also allows data to be generated pre-boot and made available to other environments in a secure manner. Two files are reserved during the build process for the firmware image in two separate secure storage firmware volumes. The first file is reserved for the public part of a public-private key, and is reserved in a secure storage firmware volume that is write-disabled. The second file is reserved for the private part of the public-private key, and is reserved in a secure storage firmware volume that is read-disabled.

At pre-boot time, a unique public-private key is generated for the particular platform, and stored in the respective secure storage firmware volumes. The algorithm for this may be any standard algorithm asymmetric key algorithm such as RSA. Subsequently, the pre-boot firmware signs content created for delivery to other environments by running a message digest algorithm over the content, and encrypting the content using the private part of the public-private key. Both the content and the resulting encrypted message digest can be stored in any storage location. When another environment receives the pre-boot content, the public part of the public-private key is stored in write-disabled storage, but may still be read. This public part is used to decrypt the message digest accompanying the content, and then the result is checked against the output of the same message digest algorithm re-applied to the content. This process ensures that the content has not been tampered with. Since the private part of the public-private key is not accessible to other environments, it is practically impossible to generate or sign other content in such a way that the public part of the public key can be used to decrypt and validate the content.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A method for securely updating firmware in a computing device, comprising:
dividing a firmware image to create a plurality of virtual image modules, the plurality of virtual image modules stored in at least one location outside a ROM image located in the computing device;
providing an update validation procedure for validating an updated virtual image module during pre-boot, the update validation procedure identified by a unique identifier and including a decryption process;
including a reference for each of the plurality of virtual image modules in a build of firmware placed in the ROM image, each reference including a version identifier, a message digest and a unique identifier for an associated virtual image module, the reference also including a validator identifier identifying the update validation procedure;
providing an updated virtual image module that includes a version identifier;
using the update validation procedure identified by the validator identifier in a reference to validate the updated virtual image module during pre-boot; and
updating a reference contained in the ROM image to one of the plurality of virtual image modules to include a message digest of the updated virtual image module and the version identifier of the updated virtual image module following the validation of the updated virtual image module.

2. The method of claim 1, further comprising:
generating a message digest for the updated virtual image module;
encrypting the message digest of the updated virtual image module with an encryption process that requires the decryption process contained in the update validation procedure to decrypt the encrypted message digest.

3. The method of claim 2, further comprising:
decrypting the encrypted message digest using the decryption process contained in the update validation procedure, the decryption being performed as part of the validation of the updated virtual image module.

4. The method of claim 3, further comprising:
comparing the decryption of the encrypted message digest with a new message digest generated by the update validation procedure in order to validate the updated virtual image module.

5. The method of claim 1, further comprising:
generating a message digest for the updated virtual image module;
encrypting the message digest with a private key; and
decrypting the encrypted message digest with a public key associated with the private key, the public key used by the update validation procedure.

6. The method of claim 1 wherein the update validation procedure compares the version identifier of one of the plurality of virtual image modules with the version identifier of the updated virtual image module to identify to the updated virtual image module as a new module.

7. The method of claim 1 wherein the update validation procedure is stored as part of the ROM image.

8. The method of claim 1 wherein the update validation procedure is stored as one of the plurality of virtual image modules.

9. The method of claim 1 wherein the ROM image is stored in one of the group of ROM (Read-Only Memory), PROM (Programmable ROM), EPROM (Erasable PROM), EEPROM (Electrically Erasable PROM) and Flash memory.

10. The method of claim 1 wherein the updated virtual image module is an EFI Framework firmware volume.

11. The method of claim 1 wherein the message digest uses one of the group of the SHA-1 algorithm or the MD5 algorithm.

12. The method of claim 1, further comprising:
generating a message digest for the updated virtual image module;
encrypting the message digest with a symmetric key; and
decrypting the encrypted message digest with the symmetric key, the symmetric key used by the update validation procedure.

13. A system for securely updating firmware in a computing device, comprising:
   a computing device, including:
      an update validation procedure including a decryption process used in validating an updated virtual module during pre-boot;
      Read Only Memory (ROM) holding a firmware ROM image that includes a reference to the update validation procedure and a reference for each of a plurality of virtual image modules, each reference including a version identifier, a message digest and a unique identifier for an associated virtual image module, and a validator identifier identifying the update validation procedure, the update validation procedure used to validate the authenticity of the updated virtual image module during pre-boot, the update validation procedure updating a reference contained in the ROM image to one of the plurality of virtual image modules to include a message digest of the updated virtual image module and the version identifier of the updated virtual image module following the validation of the updated virtual image module; and
      memory for the computing device into which the firmware ROM image and update validation procedure are loaded; and
   at least one storage location outside the ROM image that stores the plurality of virtual firmware image modules created during a build process.

14. The system of claim 13 wherein the ROM image is stored in one of the group of ROM (Read-Only Memory), PROM (Programmable ROM), EPROM (Erasable PROM), EEPROM (Electrically Erasable PROM) and Flash memory.

15. The system of claim 13 wherein the updated virtual image module is an EFI Framework firmware volume.

16. A method for securely updating firmware in a computing device, comprising:
   dividing a firmware image to create a plurality of virtual image modules, the plurality of virtual image modules stored in at least one location outside a ROM image located in the computing device;
   providing an update validation procedure for validating an updated virtual image module during pre-boot, the update validation procedure identified by a unique identifier and including a decryption process;
   including a reference for each of the plurality of virtual image modules in a build of firmware placed in the ROM image, the reference also including a validator identifier identifying the update validation procedure;
   providing an updated virtual image module on a trusted server;
   using the update validation procedure identified by the validator identifier in a reference to generate a secure tunnel between the computing device and the trusted server; and
   downloading an identified updated virtual image module to the computing device using the tunnel:
   validating the updated virtual image module; and
   updating a reference contained in the ROM image to one of the plurality of virtual image modules to include a message digest of the updated virtual image module and the version identifier of the updated virtual image module following the validation of the updated virtual image module.

17. A method for securely updating firmware in a computing device, comprising:
   dividing a firmware image to create a virtual image module that is stored in at least one location outside a ROM image located in the computing device;
   providing an update validation procedure for validating an updated virtual image module during pre-boot, the update validation procedure identified by a unique identifier and including a decryption process;
   including a reference for the virtual image module in a build of firmware placed in the ROM image, the reference including a version identifier, a message digest and a unique identifier for the associated virtual image module, the reference also including a validator identifier identifying the update validation procedure;
   providing an updated virtual image module that includes a version identifier; and
   using the update validation procedure identified by the validator identifier in a reference to validate the updated virtual image module during pre-boot; and
   updating a reference contained in the ROM image to one of the plurality of virtual image modules to include a message digest of the updated virtual image module and the version identifier of the updated virtual image module following the validation of the updated virtual image module.

18. A computing device, comprising:
   Read Only Memory (ROM) holding
   a firmware ROM image, the ROM image including
      a reference for each of a plurality of virtual image modules that are created by dividing a firmware image, the plurality of virtual image modules stored in at least one location outside the ROM image, each reference including a version identifier, a message digest and a unique identifier for an associated virtual image module, and a validator identifier identifying an update validation procedure; and
      memory into which the ROM image and an update validation procedure are loaded, the update validation procedure used to validate an updated virtual image module that includes a version identifier during pre-boot, the update validation procedure identified by a unique identifier and including a decryption process, the update validation procedure further updating a reference contained in the ROM image to one of the plurality of virtual image modules to include a message digest of the updated virtual image module and the version identifier of the updated virtual image module following the validation of the updated virtual image module.

19. The device of claim 18 wherein the update validation procedure compares the version identifier of one of the plurality of virtual image modules with the version identifier of the updated virtual image module to identify to the updated virtual image module as a new module.

20. The device of claim 18 wherein the update validation procedure is stored as part of the ROM image.

21. The device of claim 18 wherein the update validation procedure is stored as one of the plurality of virtual image modules.

22. The device of claim 18 wherein the ROM image is stored in one of the group of ROM (Read-Only Memory), PROM (Programmable ROM), EPROM (Erasable PROM), EEPROM (Electrically Erasable PROM) and Flash memory.

23. The device of claim 18 wherein the updated virtual image module is an EFI Framework firmware volume.

* * * * *